United States Patent
Tan et al.

(10) Patent No.: US 11,167,620 B2
(45) Date of Patent: Nov. 9, 2021

(54) THERMAL MANAGEMENT SYSTEM

(71) Applicant: Hangzhou Sanhua Research Institute Co., Ltd., Zhejiang (CN)

(72) Inventors: Yongxiang Tan, Zhejiang (CN); Keli Ye, Zhejiang (CN)

(73) Assignee: Hangzhou Sanhua Research Institute Co., Ltd., Zhejiang (CN)

(*) Notice: Subject to any disclaimer, the term of this patent is extended or adjusted under 35 U.S.C. 154(b) by 148 days.

(21) Appl. No.: 16/490,864

(22) PCT Filed: Mar. 7, 2018

(86) PCT No.: PCT/CN2018/078222
§ 371 (c)(1),
(2) Date: Sep. 3, 2019

(87) PCT Pub. No.: WO2018/161907
PCT Pub. Date: Sep. 13, 2018

(65) Prior Publication Data
US 2020/0070628 A1    Mar. 5, 2020

(30) Foreign Application Priority Data

Mar. 8, 2017  (CN) .......................... 201710133519.0

(51) Int. Cl.
*B60H 1/00* (2006.01)
*B60H 1/14* (2006.01)
*B60H 1/22* (2006.01)

(52) U.S. Cl.
CPC ..... *B60H 1/00885* (2013.01); *B60H 1/00328* (2013.01); *B60H 1/00485* (2013.01);
(Continued)

(58) Field of Classification Search
CPC ............ B60H 1/00385; B60H 1/00392; B60H 1/00492; B60H 1/00499; B60H 1/00885;
(Continued)

(56) References Cited

U.S. PATENT DOCUMENTS 5,598,887 A * 2/1997 Ikeda ................. B60H 1/00392
                                                        165/202
6,845,625 B1  1/2005 Pokharna
(Continued)

FOREIGN PATENT DOCUMENTS

CN            1882900 A    12/2006
CN          200943911 Y     9/2007
(Continued)

OTHER PUBLICATIONS

Extended European Search Report for European Application No. 18763067.8, dated Nov. 27, 2020.
(Continued)

*Primary Examiner* — Frantz F Jules
*Assistant Examiner* — Jason N Thompson
(74) *Attorney, Agent, or Firm* — Wolf, Greenfield & Sacks, P.C.

(57) ABSTRACT

A thermal management system. The thermal management system includes a refrigerant system and a cooling liquid system; the thermal management system further includes a fourth heat exchanger which includes a first flow channel and a second flow channel; the refrigerant system and the cooling liquid system can perform heat exchanging by means of the fourth heat exchanger, thereby facilitating improving the performance of the thermal management system.

19 Claims, 8 Drawing Sheets

(52) U.S. Cl.
CPC .............. *B60H 2001/00935* (2013.01); *B60H 2001/00942* (2013.01)

(58) Field of Classification Search
CPC .... B60H 1/00899; B60H 1/14; B60H 1/2215; B60H 1/2218; B60H 1/3228; B60H 1/32281; B60H 1/32284; B60H 1/034; B60H 1/039; B60H 1/00835; B60H 1/143; B60H 1/00485; B60H 2001/00935
USPC ........................................................ 165/240
See application file for complete search history.

(56) References Cited

U.S. PATENT DOCUMENTS

| | | | | |
|---|---|---|---|---|
| 2005/0178523 | A1* | 8/2005 | Itoh .......................... | B60L 58/33 165/42 |
| 2009/0130513 | A1* | 5/2009 | Tsuchiya ........... | H01M 8/04029 429/412 |
| 2011/0113800 | A1 | 5/2011 | Sekiya et al. | |
| 2012/0222441 | A1* | 9/2012 | Sawada .............. | B60H 1/32284 62/238.1 |
| 2012/0222446 | A1* | 9/2012 | Sekiya ............... | B60H 1/00385 62/498 |
| 2013/0206360 | A1 | 8/2013 | Zhang et al. | |
| 2013/0306302 | A1* | 11/2013 | Osaka ................. | B60H 1/00385 165/287 |
| 2014/0041826 | A1* | 2/2014 | Takeuchi ........... | B60H 1/00899 165/10 |
| 2015/0273981 | A1* | 10/2015 | Kang .................. | B60H 1/3228 62/324.6 |
| 2016/0107505 | A1* | 4/2016 | Johnston ............ | B60H 1/00914 165/202 |
| 2016/0339761 | A1 | 11/2016 | Enomoto et al. | |
| 2017/0197488 | A1* | 7/2017 | Kim .................... | B60H 1/00278 |
| 2017/0361677 | A1* | 12/2017 | Kim .................... | B60H 1/00885 |
| 2019/0030991 | A1* | 1/2019 | Enomoto ........... | B60H 1/00885 |
| 2019/0047369 | A1* | 2/2019 | Kim ........................ | F25B 21/04 |

FOREIGN PATENT DOCUMENTS

| | | |
|---|---|---|
| CN | 101413736 A | 4/2009 |
| CN | 102452297 A | 5/2012 |
| CN | 103129346 A | 6/2013 |
| CN | 103292510 B | 8/2016 |
| CN | 106004323 A | 10/2016 |
| CN | 205970710 U | 2/2017 |
| EP | 2 327 575 A1 | 6/2011 |
| FR | 3 027 557 A1 | 4/2016 |
| JP | 2003-025833 A | 1/2003 |
| JP | 2015-140115 A | 8/2015 |
| KR | 10-0610429 B1 | 8/2006 |

OTHER PUBLICATIONS

EP18763067.8, Nov. 27, 2020, Extended European Search Report.
PCT/CN2018/078222, Jun. 11, 2018, International Search Report and Written Opinion.
CN201710133519.0, May 14, 2020, First Office Action.
First Office Action for Chinese Application No. 201710133519.0, dated May 14, 2020.
International Search Report and Written Opinion for International Application No. PCT/CN2018/078222, dated Jun. 11, 2018.

* cited by examiner

THERMAL MANAGEMENT SYSTEM

This application is a national stage filing under 35 U.S.C. § 371 of International Patent Application Serial No. PCT/CN2018/078222, filed Mar. 7, 2018, which claims priority to Chinese Patent Application No. 2017/10133519.0, titled "THERMAL MANAGEMENT SYSTEM", filed with the China National Intellectual Property Administration on Mar. 8, 2017. The entire contents of these applications are incorporated herein by reference in their entirety.

FIELD

The present application relates to the technical field of thermal management.

BACKGROUND

A thermal management system includes a refrigerant system which is used for regulating the temperature in the interior of a vehicle or inside a room or in a particular region. Some equipment or devices, such as the batteries, motors or electronic equipment in vehicles, may generate heat or have cooling demands during operation, and the heat generated by these devices are beneficial to the improvement of the thermal management performance.

SUMMARY

An object of the present application is to provide a thermal management system, to improve the thermal management performance.

The thermal management system includes a refrigerant system and a coolant system, a refrigerant of the refrigerant system and a coolant of the coolant system are isolated from each other without communication. The refrigerant system includes a compressor, a first throttling device, a second throttling device, a first heat exchanger, a second heat exchanger and a first valve device, the second heat exchanger includes a first end port and a second end port, the first throttling device is in communication with the second end port of the second heat exchanger, a refrigerant inlet of the first heat exchanger is in communication with an outlet of the compressor, a refrigerant outlet of the first heat exchanger is in communication with the first valve device, the compressor is in communication with the first valve device through the first heat exchanger, the first heat exchanger is in communication with the first throttling device through the first valve device, and the first end port of the second heat exchanger is in communication with a suction port of the compressor or the refrigerant outlet of the first heat exchanger through the first valve device.

The coolant system includes a third heat exchanger and a first pump. The thermal management system further includes a fourth heat exchanger, the fourth heat exchanger includes a first flow passage and a second flow passage, an inlet of the first flow passage of the fourth heat exchanger is in communication with the second throttling device, an outlet of the first flow passage of the fourth heat exchanger is in communication with the suction port of the compressor, the second flow passage of the fourth heat exchanger is in communication with the third heat exchanger and the first pump, and the coolant system and the refrigerant system can exchange heat in the fourth heat exchanger. In a deicing mode of the thermal management system, the second heat exchanger may be in communication with the first flow passage of the fourth heat exchanger through the second throttling device.

By providing the fourth heat exchanger and the first valve device in the thermal management system, the first heat exchanger and the second heat exchanger may be in communication with the second throttling device through the first valve device, and the refrigerant system and the coolant system may exchange heat through the fourth heat exchanger, which facilitates improving the performance of the thermal management system.

BRIEF DESCRIPTION OF DRAWINGS

For more clearly illustrating embodiments of the present application or the technical solutions in the conventional technology, drawings referred to describe the embodiments or the conventional technology will be briefly described hereinafter. Apparently, the drawings in the following description are only some examples of the present application, and for those skilled in the art, other drawings may be obtained based on these drawings without any creative efforts.

DETAILED DESCRIPTION

Figure 1:
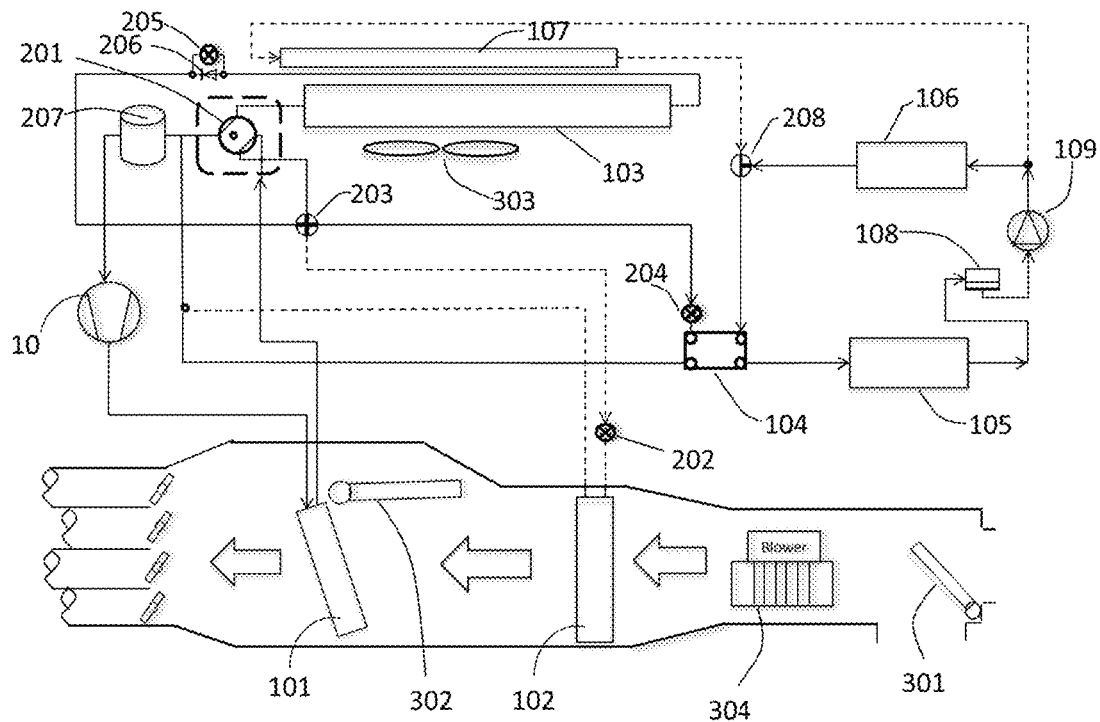
FIG. 1 is a schematic diagram showing a thermal management system in a first heating mode.
Figure 2:
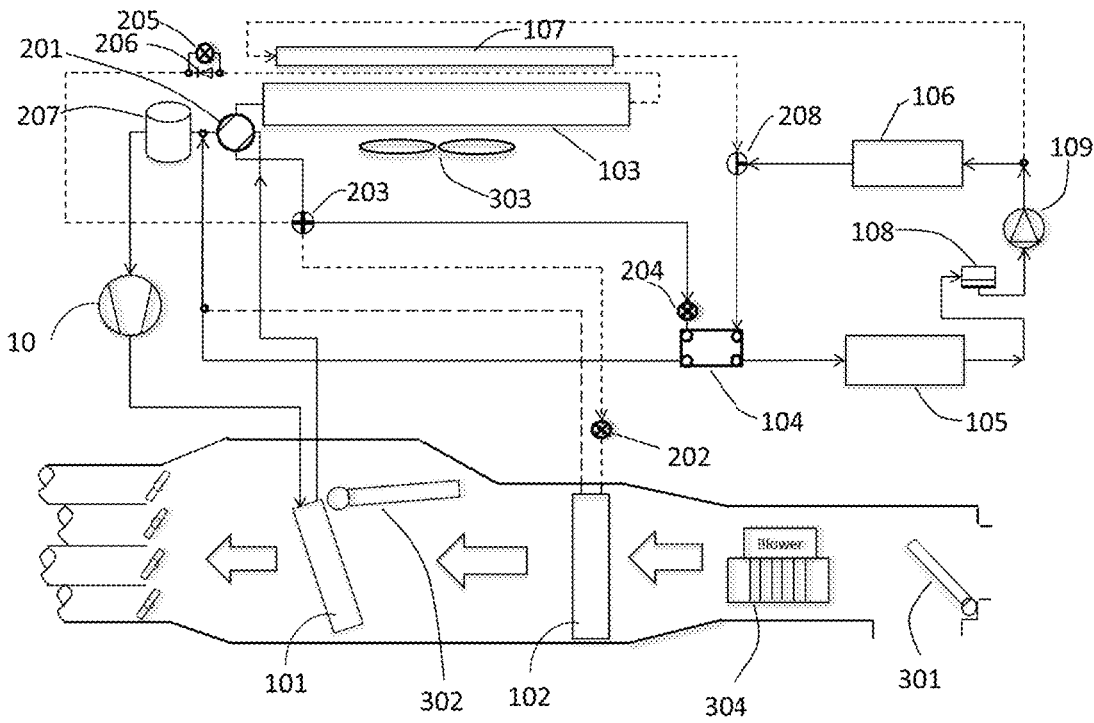
FIG. 2 is a schematic diagram showing the thermal management system in a second heating mode.

The technical solution according to the embodiments of the present application will be described clearly and completely as follows in conjunction with the accompany drawings in the embodiments of the present application. It is obvious that the described embodiments are only a part of the embodiments according to the present application, rather than all of the embodiments. All the other embodiments obtained by those skilled in the art based on the embodiments in the present application without any creative work belong to the scope of protection of the present application.

A thermal management system of the technical solution according to the present application may have various types, and some types of the thermal management system may be applied to thermal management systems for vehicles, and may also be applied to other thermal management systems such as household thermal management systems or commercial thermal management systems. A specific thermal management system for vehicles will be described hereinafter with reference to the accompanying drawings as an example. With reference to FIGS. 1 to 14, a thermal management system includes a refrigerant system and a coolant system, a refrigerant of the refrigerant system and a coolant of the coolant system are isolated from each other without communication. The coolant system includes a third heat exchanger 105 and a first pump 109. The refrigerant system includes a compressor 10, a first throttling device 205, a second throttling device 204, a first heat exchanger 101, a second heat exchanger 103 and a first valve device, the second heat exchanger 103 of the refrigerant system at least includes a first end port and a second end port, the first throttling device 205 is in communication with the second end port of the second heat exchanger 103, a refrigerant inlet of the first heat exchanger 101 is in communication with an outlet of the compressor 10, a refrigerant outlet of the first heat exchanger 101 is in communication with the first valve device, the refrigerant outlet of the first heat exchanger 101 can be in communication with the first throttling device 205 through the first valve device, the first heat exchanger 101 can also be in communication with the second throttling device 204 through the first valve device, the first end port of the second heat exchanger may also be in communication with a suction port of the compressor through the first valve device or through a gas-liquid separator 207. The thermal management system further includes a fourth heat exchanger 104, the fourth heat exchanger includes a first flow passage and a second flow passage, and the first flow passage and the second flow passage are isolated from each other without communication. The first flow passage of the fourth heat exchanger 104 is a part of a refrigerant flow passage, the second flow passage of the fourth heat exchanger 104 is a part of a coolant flow passage, and the refrigerant flowing through the first flow passage and the coolant flowing through the second flow passage may exchange heat in the fourth heat exchanger 104. An inlet of the first flow passage of the fourth heat exchanger 104 is in communication with the second throttling device 204, an outlet of the first flow passage is in communication with the suction port of the compressor or through the gas-liquid separator 207, and the second flow passage of the fourth heat exchanger 104 is in communication with the third heat exchanger 105 and the first pump 109. The coolant system further includes a fifth heat exchanger 102 and a third throttling device 202, the third throttling device 202 is arranged at an inlet of the fifth heat exchanger 102, an outlet of the fifth heat exchanger 102 is in communication with the suction port of the compressor 10 or through the gas-liquid separator 207.

Figure 15:
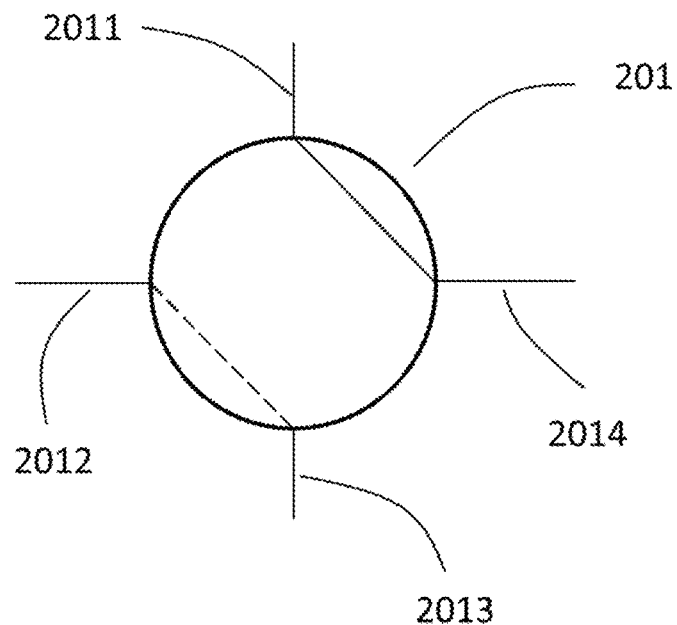
FIG. 15 is a schematic diagram showing an embodiment of a first multi-way reversing device of the thermal management system in a first operating state.

For convenience of the following description, a first communication port, a second communication port, a third communication port, and a fourth communication port are defined, the first valve device includes the first communication port, the second communication port, the third communication port, and the fourth communication port, and the first communication port, the second communication port, the third communication port, and the fourth communication port are configured to be in communication with other components of the thermal management system. The first valve device at least includes a first operating state and a second operating state, in the first operating state of the first valve device, the first valve device unblocks a communication passage between the first communication port and the third communication port, blocks a communication passage between the fourth communication port and the second communication port, and blocks a communication passage between the fourth communication port and first communication port; in the second operating state of the first valve device, the first valve device unblocks a communication passage between the first communication port and the second communication port, and unblocks a communication passage between the third communication port and the fourth communication port. The first communication port is in communication with the refrigerant outlet of the first heat exchanger 101, the fourth communication port is in communication with the suction port of the compressor 10, the second communication port is in communication with the first throttling device 205 and the second throttling device 204, the third communication port is in communication with the first end port of the second heat exchanger 103. Specifically, the first valve device of the thermal management system may be a first multi-way reversing device 201, the first multi-way reversing device 201 includes a first valve hole 2011, a second valve hole 2012, a third valve hole 2013 and a first inlet 2014, the first multi-way reversing device 201 may further include a first communication tube in communication with the first valve hole, a second communication tube in communication with the second valve hole, the third communication tube in communication with the third valve hole and a fourth communication tube in communication with the first inlet 2014. Specifically, reference is made to FIG. 15, the first inlet is in communication with the first communication port, which includes following situations: the first inlet 2014 and the first communication port are two different ports, and the first inlet 2014 is in communication with the first communication port, or the first inlet and the first communication port are the same port; the first valve hole 2011 is in communication with the third communication port, the second valve hole 2012 is in communication with the fourth communication port, the third valve hole 2013 is in communication with the second communication port. The first communication port may be arranged at the first communication tube, the second communication may be arranged at the second communication tube, the third communication port may be arranged at the third communication tube, and the fourth communication port may be arranged at the fourth communication tube. In the first operating state of the first valve device, the first multi-way reversing device 201 can unblock a communication passage between the first inlet 2014 and the first valve hole 2011, and block a communication passage between the third valve hole 2013 and the second valve hole 2012; in the second operating state of the first valve device, the first multi-way reversing device 201 can unblock a communication passage between the first valve hole 2011 and the second valve hole 2012, and unblock a communication passage between the third valve hole 2013 and the first inlet 2014.

Figure 16:
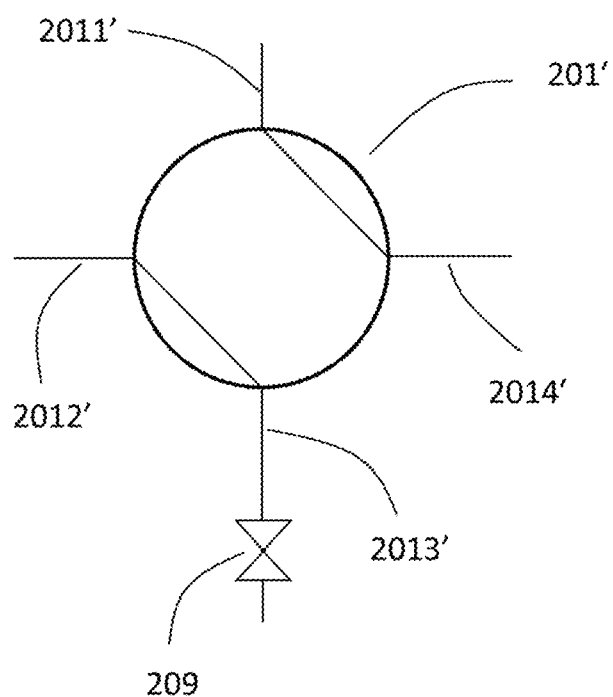
FIG. 16 is a schematic diagram showing a second multi-way reversing device of the thermal management system.

The first valve device may also include a second multi-way reversing device 201' and a first valve component 209. Specifically, reference is made to FIG. 16, the second multi-way reversing device 201' includes a second inlet 2014', a fourth valve hole 2011', a fifth valve hole 2012' and a sixth valve hole 2013'. Similarly, the second multi-way reversing device 201' may also include communication tubes that are in communication with the valve holes or inlets. The first valve component 209 includes a first end port and a second end port, the first end port of the first valve component is in communication with the sixth valve hole, the second end port of the first valve component is in communication with the second communication port, the second inlet 2014' is in communication with the first communication port, the fourth valve hole 2011' is in communication with the third communication port, and the fifth valve hole 2012' is in communication with the fourth communication port. Wherein, the second inlet 2014' is in communication with the first communication port includes the following situations: the second inlet and the first communication port are two different ports, and the second inlet is in communication with the first communication port; or the second inlet and the first communication port are the same port; the second end port of the first valve component is in communication with the second communication port includes the following situations: the second end port of the first valve component and the first communication port are two different ports, and the second end port of the first valve component is in communication with the first communication port; or the second end port of the first valve component and the first communication port are the same port. In the first operating state of the first valve device, the second multi-way reversing device 201' unblocks a communication passage between the second inlet 2014' and the fourth valve hole 2011', unblocks a communication passage between the sixth valve hole 2013' and the fifth valve hole 2012', and blocks the first valve component 209; in the second operating state of the first valve device, the second multi-way reversing device 201' unblocks a communication passage between the fourth valve hole 2011' and the fifth valve hole 2012', unblocks a communication passage between the sixth valve hole 2013' and the second inlet 2014', and unblocks the first valve component 209 at the same time. The first valve component 209 may be a shut-off valve, a flow regulating valve or a check valve, and in a case that the first valve component 209 is the check valve, the check valve is blocked in a direction that the refrigerant flows into the sixth valve hole 2013' and enters the direction of the second multi-way reversing device, and the check valve is unblocked in a direction that the refrigerant flows out of the second multi-way reversing device from the sixth valve hole 2013'.

Figure 14:
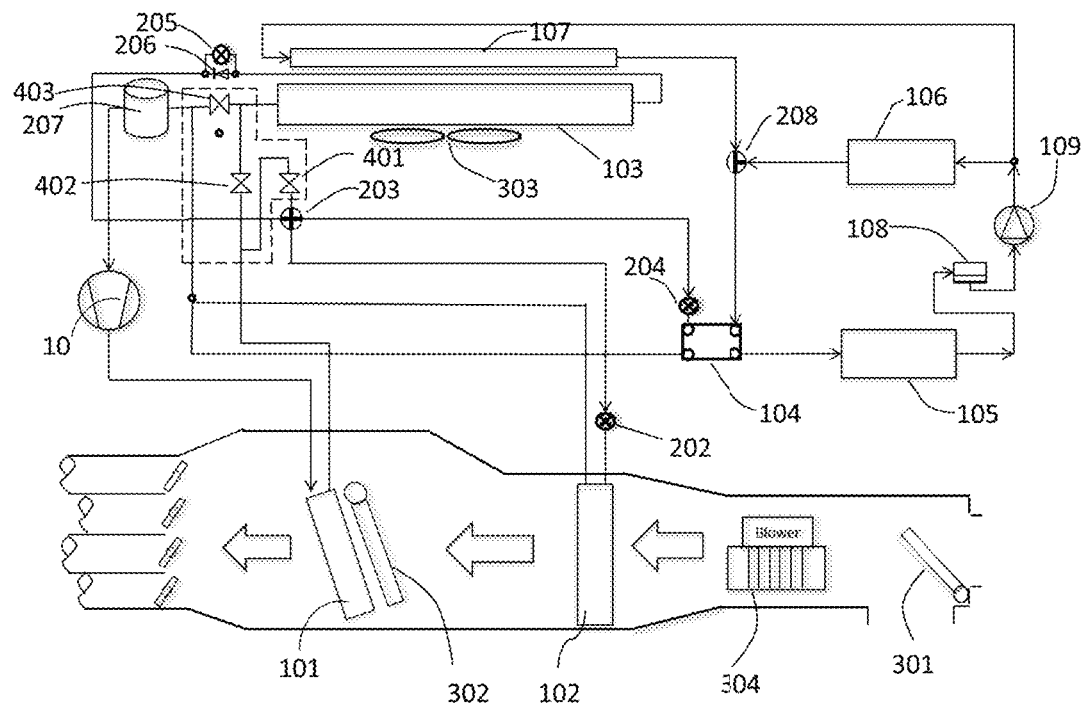
FIG. 14 is a schematic diagram showing another embodiment of the thermal management system.

With reference to FIG. 14, which shows another embodiment of the thermal management system, and only differences between this embodiment and the first embodiment are described herein. Compared with the first embodiment, the first valve device includes a first valve module 401, a second valve module 402 and a third valve module 403, the first valve module 401, the second valve module 402 and the third valve module 403 may be shut-off valves or two-way flow regulating valves, and the first valve module 401, the second valve module 402 and the third valve module 403 each includes a first end port and a second end port. Both the first end port of the first valve module 401 and the first end port of the second valve module 402 are in communication with the first communication port, the second end port of the first valve module 401 is in communication with the second communication port, both the second end port of the second valve module 402 and the second end port of the third valve module 403 are in communication with the third communication port, and the third valve module 403 is in communication with the fourth communication port. In the first operating state of the first valve device, the second valve module 402 is opened, the first valve module 401 and the third valve module 403 are closed; in the second operating state of the first valve device, the first valve module 401 is opened, the third valve module 403 is opened, and the second valve module 402 is closed. In other technical solutions of the present embodiment, the first valve module 401 and the second valve module 402 may be replaced by a first three-way valve (not shown in the Figures). Specifically, the first three-way valve includes a first port, a second port and a third port, the first port of the first three-way valve is in communication with the first communication port, both the second port and the second end port of the third valve module are in communication with the third communication port, the first end port of the third valve module is in communication with the fourth communication port, and the third port is in communication with the second communication port. In the first operating state of the first valve device, the first three-way valve unblocks a communication passage between the first port and the second port, the first three-way valve blocks a communication passage between the first port and the third port, and the third valve module is closed; in the second operating state of the first valve device, the first three-way valve unblocks the communication passage between the first port and the third port, the third valve module is opened, and the first three-way valve blocks the communication passage between the first port and second port. Specifically, the first port of the first three-way valve is in communication with the refrigerant outlet of the first heat exchanger 101, the second port of the first three-way valve is in communication with the first end port of the second heat exchanger 103, the third port of the first three-way valve is in communication with the inlet of the fifth heat exchanger 102 through the third throttling device 202, the third port of the first three-way valve is in communication with the refrigerant inlet of the first flow passage of the fourth heat exchanger 104 through the second throttling device 204, and the third port of the first three-way valve is in communication with the second end port of the second heat exchanger 103; or, the third port of the first three-way valve is in communication with the third throttling device 202, the second throttling device 204 and the second end port of the second heat exchanger 103 through a four-way valve 203. Similarly, the end port or port in communication with each of the communication ports is the same port as the communication port or the port in communication with the communication port, which will not be described in detail.

The four-way valve 203 of the thermal management system includes four end ports, one of the end ports is in communication with the third valve hole 2013 or the first valve component 209 or the first valve module 401, the other three end ports of the four-way valve 203 are in communication with the first throttling device, the second throttling device and the third throttling device, respectively. It can be understood that, the four end ports of the four-way valve 203 may also be connected to shut-off valves or flow regulating valves to control flow paths to be unblocked or blocked. If the four end ports of the four-way valve 203 are not connected to the shut-off valves or the flow regulating valves, the thermal management system controls the first throttling device 205 to control the refrigerant to flow into the second heat exchanger 103 or not, and controls the second throttling device 204 to control the refrigerant to flow into the fourth heat exchanger 104 or not, and controls the third throttling device 202 to control the refrigerant to flow into the fifth heat exchanger 102 or not.

The second end port of the second heat exchanger 103 is further provided with a unidirectional element 206, the unidirectional element 206 is arranged in parallel with the first throttling device 205, in other words, the second communication port can be in communication with the second port of the second heat exchanger 103 through the first throttling device 205 and the unidirectional element 206 which are arranged in parallel. The unidirectional element 206 is unblocked in a direction that the refrigerant flows out of the second end port of the second heat exchanger 103, and is blocked in a direction that the refrigerant flows toward the second end port of the second heat exchanger 103. In addition, the first throttling device 205 may be embodied as a throttling device having a cut-off function, and in this case, the unidirectional element 206 may be omitted. In a case that the first throttling device 205 has an unidirectional cut-off function, the first throttling device 205 is unblocked when a fluid flows in a direction from the second heat exchanger 103 to the third valve hole 2013, and the first throttling device 205 is in a throttling state when the fluid flows in a direction from the third valve hole 2013 to the second heat exchanger 103. In addition, the connection or communication described in the present application may be direct, for example, two components may be assembled together, in this case, connecting pipes may be omitted, and the system is more compact; or the connection or communication may be indirect, for example, components are in communication through pipes or through a certain component, which will not be described in details herein. In the technical solution of the present application, the throttling device being fully opened means that an opening degree of the throttling device is maximum, the throttling device being closed means that the opening degree of the throttling device is zero, and the throttling device being turned on refers to a state between being fully opened and closed, which means the throttling state of the throttling device.

The coolant system of the thermal management system further includes a tank 108, a medium in the tank 108 may be the coolant, and the second flow passage of the fourth heat exchanger 104, the tank 108, and the first pump 109 and the third heat exchanger 105 are connected in series. The tank 108 may be a part of a flow passage of the coolant system, or the tank 108 may be only in communication with the coolant flow passage, which means the coolant in the tank does not participate in the flowing of the coolant. The coolant system can exchange heat with the refrigerant system through the fourth heat exchanger 104. The third heat exchanger 105 may be a temperature controller for heat generating equipment, the heat generating equipment may include batteries, motors or electronic equipment, etc. The third heat exchanger 105 is used to heat or cool the heat generating equipment such as the a battery, in other words, the third heat exchanger can absorb heat released from the heat generating equipment such as the battery or release heat to the heat generating equipment such as the battery. The third heat exchanger 105 may also be the temperature controller for other equipment. The thermal management system further includes a heating device 106, the heating device at least includes two end ports, a coolant flow passage in communication with the two end ports of the heating device, and a heating core. The heating core can heat the coolant flowing through the heating device 106, and the heating device may be an electrical heating device or a heating device in other forms. The heating device 106 is arranged in the coolant system, specifically, the heating device 106, the first pump 109, the third heat exchanger 105 and the second flow passage of the fourth heat exchanger 104 are connected in series. The thermal management system can choose whether to heat the coolant by controlling the heating device, in a case that the coolant is required to be heated by the heating device, the thermal management system turns on the heating device; in a case that the coolant is not required to be heated by the heating device, the thermal management system turns off the heating device, and in this case, the heating device is only a flow passage of the coolant. In other technical solutions, the coolant system may further include a first valve unit and a second valve unit, the first valve unit, the second flow passage of the fourth heat exchanger 104, the third heat exchanger and the first pump are connected in series, the second valve unit and the heating device 106 are connected in series, the second valve unit and the heating device 106 connected in series are arranged in parallel with the first valve unit, in other words, the first valve unit can bypass the heating device and the second valve unit. Further, the second valve unit, the heating device 106, the second flow passage of the fourth heat exchanger 104, the third heat exchanger and the first pump are connected in series, in this way, the thermal management system chooses whether to allow the coolant to flow into the heating device by controlling the first valve unit and the second valve unit. For example, in a case that the first valve unit is opened, the second valve unit may be opened or closed, and the coolant flows through the heating device; in a case that the valve unit is closed, the second valve unit may be opened, and the coolant does not flow into the heating device. Wherein, the first valve unit and the second valve unit may be a shut-off valve or a flow regulating valve. Or, the thermal management system includes a second three-way valve (not shown in the Figures), the second three-way valve includes a first end port, a second end port and a third end port, the first end port of the second three-way valve is in communication with the heating device, in other words, the first end port of the second three-way valve can be in communication with the first end port of the second flow passage of the fourth heat exchanger through the heating device, the second end port of the second three-way valve is in communication with the first end port of the second flow passage of the fourth heat exchanger, the third end port of the second three-way valve is in communication with the second end port of the second flow passage of the fourth heat exchanger, in this way, the thermal management system chooses whether to allow the coolant to flow into the heating device by controlling the second three-way valve, the second three-way valve can unblock or block a communication passage between the third end port of the second three-way valve and the first end port of the second three-way valve, and can unblock or block a communication passage between the third end port of the second three-way valve and the second end port of the second three-way valve.

Other embodiments may also be adopted in the technical solutions of the present application. For example, the thermal management system includes a radiator 107 and a third three-way valve 208, and the third three-way valve 208 includes a first connection port, a second connection port and a third connection port. Specifically, the third connection port may be an inlet of the third three-way valve 208, correspondingly, the second connection port and the first connection port may be outlets of the third three-way valve; or, the third connection port may be the outlet of the third three-way valve, correspondingly, the second connection port and the first connection port are the inlets of the third three-way valve. Specifically, the first connection port of the third three-way valve 208 is in communication with the first end port of the heating device 106, in other words, the first connection port of the third three-way valve 208 can be in communication with the second end port of the second flow passage of the fourth heat exchanger through the heating device 106; the second connection port of the third three-way valve 208 is in communication with the first end port of the radiator 107, in other words, the second connection port of the third three-way valve 208 is in communication with the second end port of the second flow passage of the fourth heat exchanger through the radiator 107, the third connection port of the third three-way valve 208 is in communication with the first end port of the second flow passage of the fourth heat exchanger 104, and the thermal management system can control the coolant to flow into the heating device 106 or the radiator 107 by the third three-way valve 208. Or, the third three-way valve 208 may be replaced by a third valve unit and a fourth unit. Specifically, the radiator 107 is in communication with the first end port of the second passage of the fourth heat exchanger 104 through the third valve unit, the heating device 106 is in communication with the first end port of the second passage of the fourth heat exchanger 104 through the fourth valve unit, the thermal management system can control the coolant to flow into the heating device 106 or the radiator 107 by the third valve unit and the fourth unit, in other words, the radiator and the heating device may bypass each other.

The third throttling device 202 and the first throttling device 205 may be throttling devices such as thermal expansion valves, or electronic expansion valves, or capillaries or the like. The unidirectional element 206 may be a shut-off valve or a flow regulating valve or an electromagnetic valve having a blocking and unblocking control function, or may be a check valve. The unidirectional element or the valve module may also be integrated with the heat exchanger to form an assembly, so that the structure is more compact, for example, an assembly formed by integrating the third throttling device 202 and the fifth heat exchanger 102. In addition, the first valve module 401, the second valve module 402, the third valve module 403 and the unidirectional element 206 described hereinafter may be electrically controlled on-off valves, such as electromagnetic valves, or may be on-off control valves such as flow regulating valves, as long as the flow paths of the refrigerant can be controlled to be unblocked or blocked, and other valve components described hereinafter may also be an on-off control valves such as flow regulating valves or electromagnetic valves.

The thermal management system further includes an air conditioning cabinet (unlabeled), the air conditioning cabinet includes an air conditioning cabinet body, and the air conditioning cabinet body is provided with a plurality of air ducts (not shown in Figures) in communication with an interior of a vehicle, the air ducts are provided with grates that can adjust sizes of the air ducts. One side of the air conditioning cabinet body from which air enters is provided with an internal circulation vent, an external circulation vent, a circulation air door 301 that can adjust sizes of the internal circulation vent and the external circulation vent, and a motor for driving the circulation air door 301. The internal circulation vent is in communication with the interior of the vehicle, the air inside the vehicle enters the air conditioning cabinet body through the internal circulation vent and then reenters the interior of the vehicle through the air ducts, to form internal circulation; the external circulation vent is in communication with an exterior of the vehicle, the air outside the vehicle enters the air conditioning cabinet body through the external circulation vent and then enters the interior of the vehicle through the air ducts. The circulation air door 301 is arranged between the internal circulation vent and the external circulation vent, a controller can control the circulation air door 301 by the motor; when the circulation air door 301 is switched to the internal circulation vent, the internal circulation vent can be closed, to form the external circulation, and when the circulation air door 301 is switched to the external circulation vent, the external circulation vent can be closed, to form the internal circulation; the sizes of the internal circulation vent and the external circulation vent can be adjusted by adjusting a position of the circulation air door 301, so as to adjust a ratio of the air outside the vehicle to the air inside the vehicle in the air entering the air conditioning cabinet body. In addition, one side of the second heat exchanger 103 is further provided with a fan 303 which can accelerate the air flowing through the second heat exchanger.

The first heat exchanger 101 is arranged in the air conditioning cabinet body, and a blower 304 is arranged at a position in the air conditioning cabinet body close to the internal circulation vent and the external circulation vent. A temperature-regulating air door 302 is further arranged at a windward side of the first heat exchanger 101, in a case that the thermal management system further includes the fifth heat exchanger 102, the first heat exchanger 101 and the fifth heat exchanger 102 are arranged at a certain distance from each other in the air conditioning cabinet body, or, the temperature-regulating air door 302 is arranged between the first heat exchanger 101 and the fifth heat exchanger 102. When the temperature-regulating air door 302 is opened, the air blown from the internal circulation vent or the external circulation vent may pass through the first heat exchanger 101 behind the temperature-regulating air door 302; when the temperature-regulating air door 302 is closed, the air blown from the internal circulation vent or the external circulation vent cannot pass through the first heat exchanger 101, the air flows by a peripheral side of the temperature-regulating air door 302, and then enters the interior of the vehicle through the air ducts. According to the technical solution of the present application, the heating device 106 is not arranged in the air ducts of the air conditioning cabinet body, the heating device 106 further includes a coolant flow passage, the coolant of the coolant system flows through the coolant flow passage of the heating device 106, and the heat of the heating device 106 is transferred to the second flow passage of the fourth heat exchanger through the coolant. The heating device 106 is not arranged in the air ducts inside the air conditioning cabinet body, which reduces wind resistance and increases heat exchange efficiency of the first heat exchanger 101 and the fifth heat exchanger 102; the radiator 107 may be arranged in parallel with the second heat exchanger 103, which facilitates heat dissipation via the fan 303; the radiator 107 may also be arranged in parallel with the heating device 106, and both the radiator 107 and the heating device 106 are arranged in an engine compartment.

The thermal management system includes a heating mode, a cooling mode, a dehumidification mode, and a deicing/defrosting mode. Working conditions of the thermal management system in the above modes are described hereinafter. The heating mode of the thermal management system includes a first heating mode, a second heating mode and a third heating mode. In a case that an ambient temperature is too low, and the performance of the first heat exchanger 101 is not good enough, or the energy pumped from the second heat exchanger 103 by the thermal management system is insufficient to supply heat required by the interior of the vehicle, or a heat demand required by the interior is great, and the heat demand cannot be satisfied only by heat pumped from the outside by the second heat exchanger, the thermal management system enters the first heating mode, and reference is made to FIG. 1. In the first heating mode, the first valve device or the first multi-way reversing device 201 is in the second operating state, the first throttling device 205 and the second throttling device 204 are turned on, the refrigerant of the thermal management system is compressed from a low-temperature and low-pressure refrigerant to become a high-temperature and high-pressure refrigerant, the refrigerant coming from the outlet of the compressor 10 enters the first heat exchanger 101 through the refrigerant inlet of the first heat exchanger 101, at this time, the temperature-regulating air door 302 is opened, the refrigerant of the first heat exchanger 101 exchanges heat with the air around the first heat exchanger 101 in the air ducts, the refrigerant of the first heat exchanger 101 releases heat to the surrounding air. A flow path leading from the refrigerant outlet of the first heat exchanger 101 to the second end port of the second heat exchanger 103 and the first flow passage of the fourth heat exchanger 104 is unblocked, and a flow path leading from the refrigerant outlet of the first heat exchanger 101 to the fifth heat exchanger 102 is blocked. Correspondingly, the refrigerant enters the second heat exchanger 103 after being throttled by the first throttling device 205, the low-temperature and the low-pressure refrigerant exchanges heat with the surrounding air in the second heat exchanger 103, to absorb heat from the air. The fan 303 arranged nearby the second heat exchanger 103 blows the air around the second heat exchanger 103 to form airflow, so as to accelerate the heat exchange between the second heat exchanger 103 and the surrounding air, to absorb heat from the air. The refrigerant flowing through the first flow passage of the fourth heat exchanger 104 exchanges heat with the coolant of the coolant system, the heat generating equipment such as the battery and the like exchanges heat with the third heat exchanger 105, the third heat exchanger absorbs the heat of the heat generating equipment such as the battery and the like, and the thermal management system pumps the heat absorbed from the heat generating equipment such as the battery and the like by the third heat exchanger 105 through the fourth heat exchanger 104. It can be known that, in this case, the coolant flow passage of the heating device is only the flow passage of the coolant system. In addition, in a case that the heat fails to meet the requirement, the heating device 106 is operated, and the heating device 106 releases heat to the coolant, so as to increase the heat absorbed by the refrigerant of the fourth heat exchanger 104 through heat exchange between the coolant system and the refrigerant system in the fourth heat exchanger 104. The refrigerant flowing out of the second heat exchanger 103 may flow back to the compressor, and in a case that the refrigerant may be liquid or of two phases containing gas and liquid, a gas-liquid separator may be provided, the refrigerant flowing out of the second heat exchanger 103 enters the gas-liquid separator 207, through the separation of the gas-liquid separator 207, after the refrigerant is separated by the gas-liquid separator 207, the liquid refrigerant is stored in the gas-liquid separator, and the low-temperature and low-pressure refrigerant enters the compressor 10, to be compressed again to become the high-temperature and high-pressure refrigerant, and the operation is repeated like this. Besides, in a case that the compressor can withstand the liquid refrigerant, the gas-liquid separator 207 may not be provided, or the gas-liquid separator 207 may be replaced with a liquid reservoir. In a case that the refrigerant is not in a two-phase state, the gas-liquid separator may also not be provided.

In winter, a temperature outside the vehicle is low in some areas. In a case that the outside temperature is below zero degrees Celsius or close to zero degrees Celsius, the second heat exchanger 103 absorbs heat from the ambient air in the heating mode, since the temperature of the ambient air is below zero degrees Celsius or close to zero degrees Celsius, a surface of the second heat exchanger 103 is prone to frost or freeze after the thermal management system is operated in the heating mode for a long time, thereby affecting energy efficiency of the heat pump and even making the heat pump fail to generate heat, and the thermal management system enters the second heating mode, which is referred to FIG. 2. In the second heating mode, the second heat exchanger 103 fails or the second heat exchanger 103 is required to be defrosted after freezing, and the second heat exchanger 103 cannot adsorb heat from the outside or the heat exchange efficiency is low, in other words, the thermal management system cannot pump heat from the second heat exchanger 103; the first multi-way reversing device 201 is in the second operating state, the refrigerant discharged from the first heat exchanger 101 enters the second throttling device 204 through the first valve device or the first multi-way reversing device 201, the second throttling device 204 is in operation, the first throttling device 205 and the third throttling device 202 are closed, and the first pump 109 is turned on, to drive the coolant of the coolant system to flow, and the heat generating equipment such as the battery and the like exchanges heat with the fourth heat exchanger; and/or the heating device 106 is turned on, to heat the coolant of the coolant system, the coolant of the coolant system exchanges heat with the refrigerant in the fourth heat exchanger 104, and the refrigerant absorbs heat from the coolant. In the case that the second heat exchanger freezes or fails, a certain amount of heat can still be provided to the interior by utilizing the heat from the heating device and/or the heat generating equipment such as the battery, which is beneficial for improving comfortableness.

Figure 3:
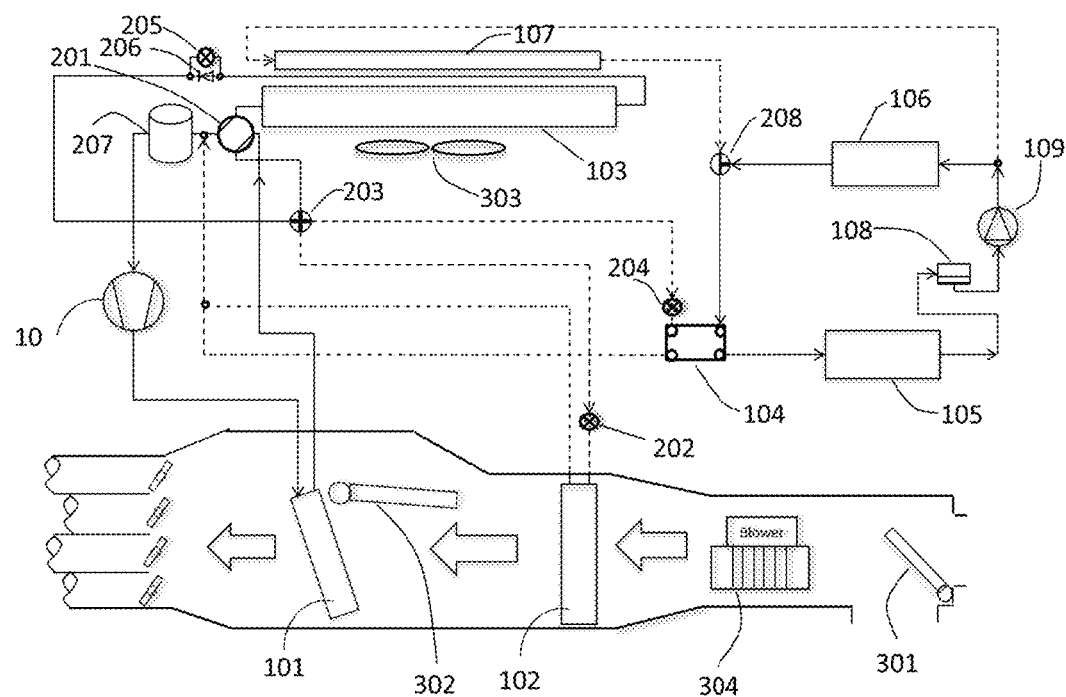
FIG. 3 is a schematic diagram showing a first embodiment of the thermal management system in a third heating mode.
Figure 4:
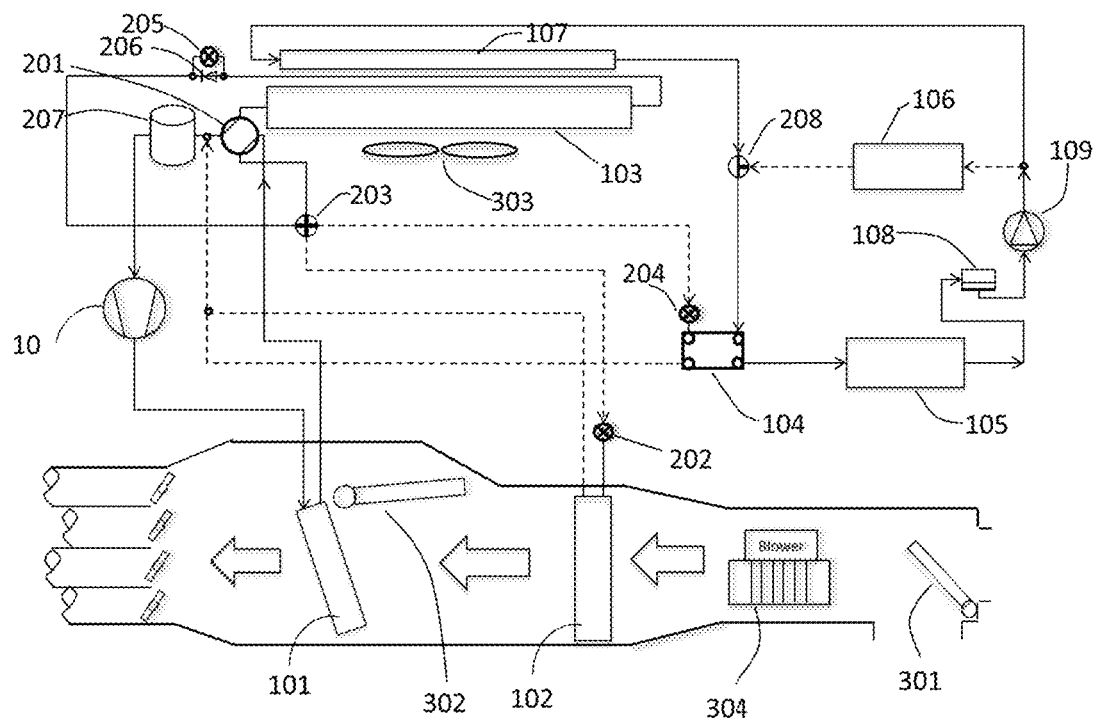
FIG. 4 is a schematic diagram showing a second embodiment of the thermal management system in the third heating mode.
Figure 5:
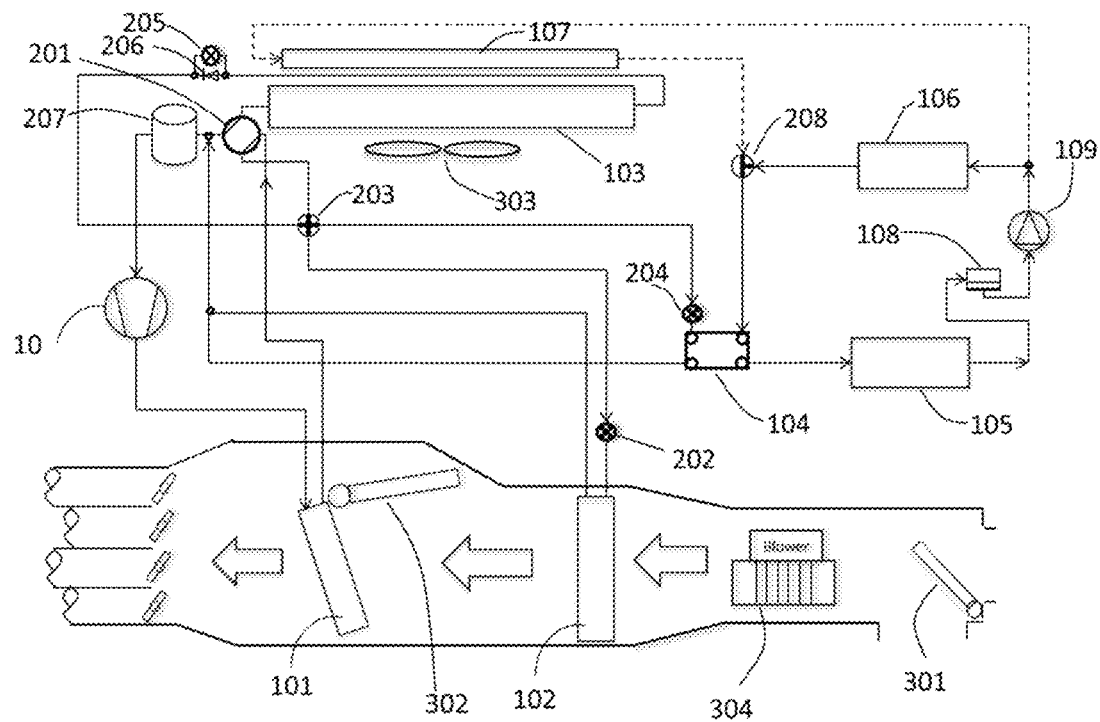
FIG. 5 is a schematic diagram showing a first embodiment of the thermal management system in a first dehumidification mode.
Figure 6:
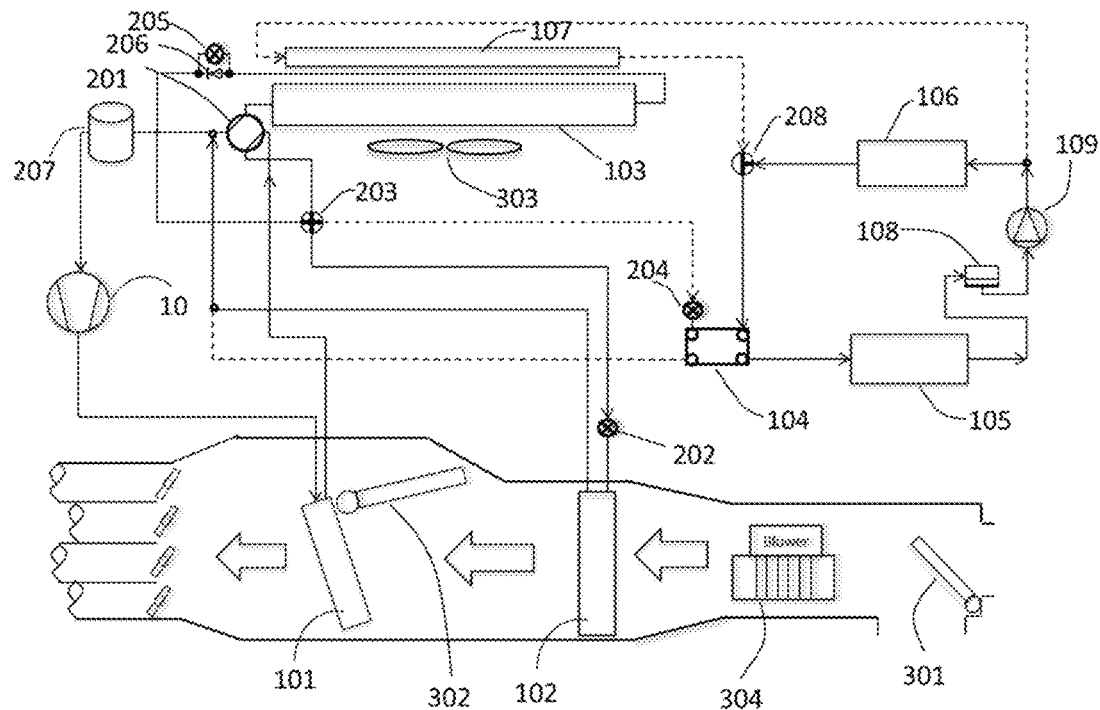
FIG. 6 is a schematic diagram showing a second embodiment of the thermal management system in the first dehumidification mode.

With reference to FIGS. 3 and 4, in a case that the ambient temperature is relatively high, the thermal management system enters the third heating mode, the compressor 10 compresses the low-temperature and low-pressure refrigerant to become the high-temperature and high-pressure refrigerant, the refrigerant coming from the outlet of the compressor 10 enters the first heat exchanger 101 through the refrigerant inlet of the first heat exchanger 101, at this time, the temperature-regulating air door 302 is opened, the refrigerant of the first heat exchanger 101 exchanges heat with the air around the first heat exchanger 101 in the air ducts, the refrigerant of the first heat exchanger 101 releases heat to the surrounding air, and the refrigerant of the first heat exchanger 101 after the heat exchange releases heat. The first valve device is set to be in the second operating state, the first throttling device 205 is turned on, the flow path leading from the refrigerant outlet of the first heat exchanger 101 to the second end port of the second heat exchanger 103 is unblocked, the second throttling device 204 and the third throttling device 202 are closed, the flow path leading to the fifth heat exchanger 102 is blocked, and the flow path leading to the first flow passage of the fourth heat exchanger 104 is blocked. Correspondingly, the refrigerant enters the second heat exchanger 103 after being throttled by the first throttling device 205, the low-temperature and low-pressure refrigerant exchanges heat with the surrounding air in the second heat exchanger 103, to absorb heat from the air. The fan 303 arranged nearby the second heat exchanger 103 blows the air around the second heat exchanger 103 to form the airflow, so as to accelerate the heat exchange between the second heat exchanger 103 and the surrounding air. The second heat exchanger 103 absorbs heat from the air, the refrigerant flows out of the second heat exchanger 103 to enter the gas-liquid separator 207, through the separation of the gas-liquid separator 207, the liquid refrigerant is stored in the gas-liquid separator, and the low-temperature and low-pressure refrigerant enters the compressor 10, to be compressed again to become the high-temperature and high-pressure refrigerant, and the operation is repeated like this. The refrigerant flowing to the first flow passage of the fourth heat exchanger 104 is blocked, and the coolant system and the refrigerant system of the thermal management system do not substantially exchange heat with each other. In a case that the heat generating equipment such as the battery and the like has a relatively low temperature and is required to be heated, the heating device 106 and the first pump are turned on, at this time, the second flow passage of the fourth heat exchanger 104 only functions as the flow passage of the coolant system, the fourth heat exchanger 104 does not substantially participate in the heat exchange, and the heat generating equipment such as the battery and the like absorbs the heat from the heating device through the coolant system, as shown in FIG. 3. In a case that the heat generating equipment such as the battery and the like has a relatively high temperature and is required to release heat, the first pump 109 is turned on, the third connection port of the second three-way valve is opened, and the second connection port of the second three-way valve is closed, the heating device 106 does not participate in the coolant system, the radiator 107 is in communication with the coolant system, and the heat generating equipment such as the battery and the like releases the heat of the heat generating equipment such as the battery and the like through the radiator 107, as shown in FIG. 4.

When relative humidity of a passenger compartment of the vehicle is relatively high, water vapor in the air is likely to condense on window glass of the vehicle, which affects a visual field, and thereby causing a potential safety hazard. Therefore, dehumidification of the air is required in the passenger compartment. The dehumidification mode of the thermal management system includes a first dehumidification mode, a second dehumidification mode, and a third dehumidification mode. In a case that the temperature is low and a heating demand is large, the first dehumidification mode is employed, which is referred to FIG. 5. In the first dehumidification mode, the temperature-regulating air door 302 is opened, the first valve device is controlled to be in the second operating state; the third throttling device 202 is turned on, and the refrigerant outlet of the first heat exchanger 101 is in communication with the fifth heat exchanger 102; the first throttling device 205 is turned on, and the refrigerant outlet of the first heat exchanger 101 is in communication with the second end port of the second heat exchanger 103; and/or the second throttling device 204 is chosen to be turned on, and the refrigerant outlet of the first heat exchanger 101 is in communication with the first flow passage of the fourth heat exchanger 104. The refrigerant is compressed by the compressor 10 to become a high-temperature and high-pressure gas, the refrigerant discharged from the compressor 10 enters the first heat exchanger 101, at this time, the temperature-regulating air door 302 is opened, the high-temperature and high-pressure refrigerant exchanges heat with the air around the first heat exchanger 101 in the first heat exchanger 101, to release the heat to the air around the first heat exchanger 101; the refrigerant enters the first throttling device 205, the second throttling device 204 and the third throttling device 202 respectively, the refrigerant is throttled and depressurized by the third throttling device 202 to be a low-temperature and low-pressure medium, the low-temperature and low-pressure refrigerant exchanges heat with the ambient air in the fifth heat exchanger 102, to absorb the heat from the ambient air. Since humidity of a surface of the fifth heat exchanger 102 is low, water vapor in the air is condensed, the air is cooled and dehumidified, and the refrigerant which has passed through the fifth heat exchanger 102 passes through the gas-liquid separator 207 to enter the suction port of the compressor 10. Similarly, after being throttled by the first throttling device 205, the refrigerant is depressurized to be a low-temperature and low-pressure medium, the low-temperature and low-pressure refrigerant exchanges heat with the ambient air in the second heat exchanger 103, to absorb the heat from the ambient air, and the refrigerant can enter the suction port of the compressor 10 through the gas-liquid separator 207. After being throttled by the second throttling device 204, the refrigerant is depressurized to be a low-temperature and low-pressure medium, at this time, the first pump 109 is turned on, the coolant of the coolant system is driven by the first pump 109 to flow in the coolant system, to exchange heat with the refrigerant in the fourth heat exchanger 104, the refrigerant absorbs the heat from the heat exchange medium of the coolant system, and the coolant cooled in the fourth heat exchanger 104 cools the heat generating equipment such as the battery and the like in the third heat exchanger 105. In a case that the temperature of the heat generating equipment such as the battery and the like is lower than an operating temperature, a flow path from the first heat exchanger 101 to the fourth heat exchanger 104 may be controlled to be blocked, the heating device 106 is turned on, and the first pump is turned on, to heat the heat generating equipment such as the battery and the like, and reference is made to FIG. 6 for details.

Figure 7:
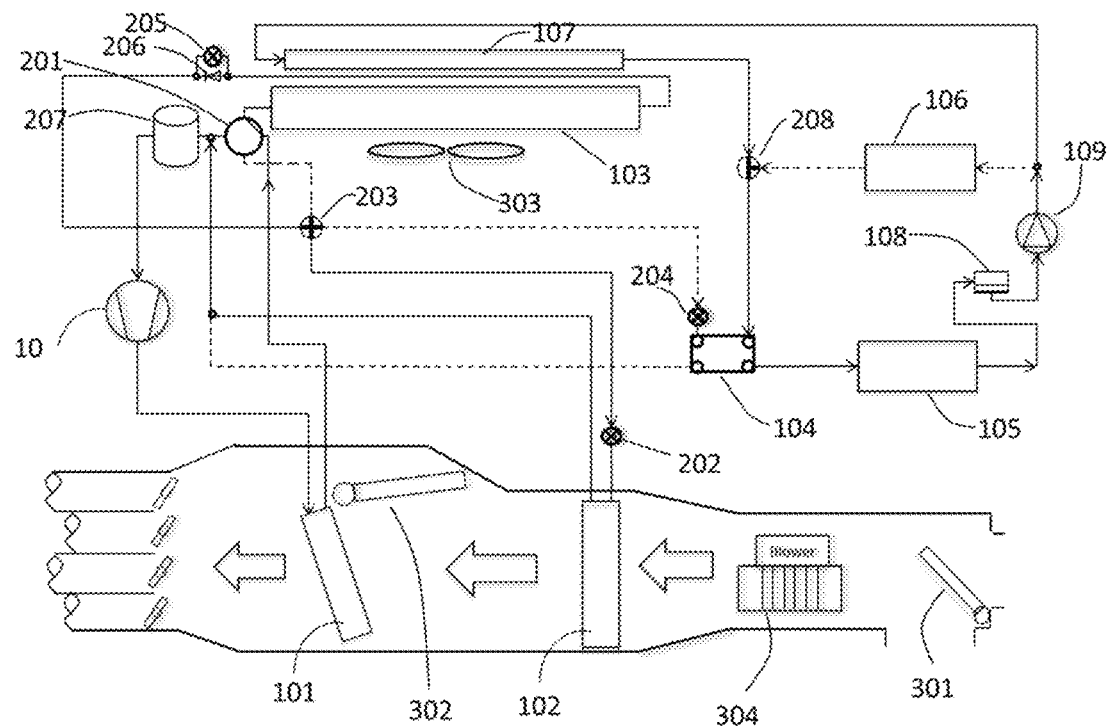
FIG. 7 is a schematic diagram showing the thermal management system in a second dehumidification mode.

In a case that the heating demand is not large and the third heat exchanger is required to cool the heat generating equipment such as the battery and the like, the second dehumidification mode can be employed, and reference is made to FIG. 7. At this time, the first valve device is controlled to be in the first operating state, the refrigerant outlet of the first heat exchanger 101 is in communication with the first end port of the second heat exchanger 103, the third throttling device is turned on, a flow path leading from the second heat exchanger 103 to the fifth heat exchanger 102 is unblocked, the second throttling device 204 is closed, and a flow path leading from the second heat exchanger 103 to the first flow passage of the fourth heat exchanger 104 is blocked. The refrigerant is compressed by the compressor 10 to be a high-temperature and high-pressure gas, the refrigerant discharged from the compressor 10 enters the first heat exchanger 101, at this time, the temperature-regulating air door 302 is opened, the refrigerant exchanges heat with the ambient air in the first heat exchanger 101, the ambient air is heated by absorbing the heat from the refrigerant in the first heat exchanger 101. The refrigerant enters the second heat exchanger 103 through the first valve device, the refrigerant exchanges heat with the ambient air in the second heat exchanger 103, to release heat to the ambient air, and the refrigerant becomes low-temperature and high-pressure, the refrigerant cooled in the second heat exchanger 103 enters the fifth heat exchanger 102, and the refrigerant exchanges heat with the air around the fifth heat exchanger 102, to absorb the heat from the air around the fifth heat exchanger 102, so as to cool and dehumidify the air around the fifth heat exchanger 102, the water vapor in the air is condensed when the temperature is low, and thereby achieving the purpose of dehumidification. At this time, the temperature-regulating air door 302 in front of the first heat exchanger 101 of the air conditioning cabinet body is fully opened, the airflow is first cooled and dehumidified through the fifth heat exchanger 102 to become low-temperature and low-humidity airflow, and then heated by the first heat exchanger 101 to become the low-humidity airflow, the heated airflow flows into the interior of the vehicle through the grates, to function to dehumidify the interior of the vehicle. The heat generated by the heat generating equipment such as the battery and the like is released to the coolant of the third heat exchanger, the first pump is turned on, the coolant is driven by the first pump to enter the radiator, to release heat in the radiator, so as to reduce the temperature of the equipment such as the battery and the like. In the second dehumidification mode, the air around the first heat exchanger 101 only absorbs a part of the heat of the refrigerant, the second heat exchanger 103 functions as a condenser to release heat to the ambient air, the fifth heat exchanger 102 functions as an evaporator to absorb heat from the air around the fifth heat exchanger 102, so as to cool and dehumidify the air entering the interior of the vehicle, and the first heat exchanger 101 functions to heat the air entering the interior of the vehicle. A cooling degree of the fifth heat exchanger 102 is related to an amount of refrigerant entering the fifth heat exchanger 102, and a cooling effect is relatively better when the amount of refrigerant is greater, thereby achieving dehumidification of the air entering the interior of the vehicle. In the third dehumidification mode, in a case that the heat generating equipment such as the battery and the like requires cold energy to decrease the temperature, the second throttling device 204 may be turned on, to unblock the flow path of the refrigerant leading to the fourth heat exchanger, the first pump 109 is turned on, the heat exchange medium of the fourth heat exchanger 104 is driven by the first pump 109 to flow in the second flow passage of the fourth heat exchanger 104, to exchange heat with the refrigerant in the first flow passage of the fourth heat exchanger 104, the refrigerant in the first flow passage of the fourth heat exchanger 104 absorbs the heat of the coolant, and the coolant is cooled by absorbing the cold energy of the refrigerant, and thereby reducing the temperature of the heat generating equipment such as the battery and the like. In a case that the temperature of the heat generating equipment such as the battery and the like is not too high, the radiator 107 may be incorporated into the coolant system, and the heat of the heat generating equipment such as the battery and the like is released through the radiator 107; or the temperature of the heat generating equipment such as the battery and the like is relatively low, which is lower than the operating temperature of the heat generating equipment such as the battery and the like, the heating device 106 is incorporated into the coolant system, the heating device 106 and the first pump 109 are turned on, and the heat generating equipment such as the battery and the like is heated by the heating device.

Figure 8:
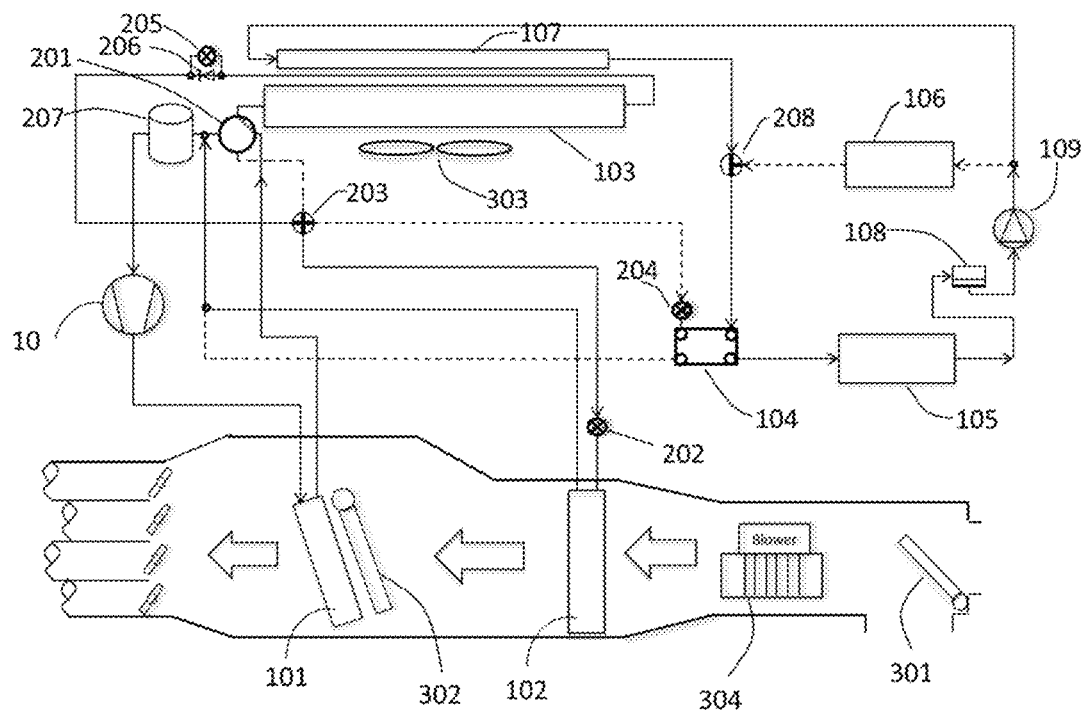
FIG. 8 is a schematic diagram showing a first embodiment of the thermal management system in a first refrigeration mode.
Figure 9:
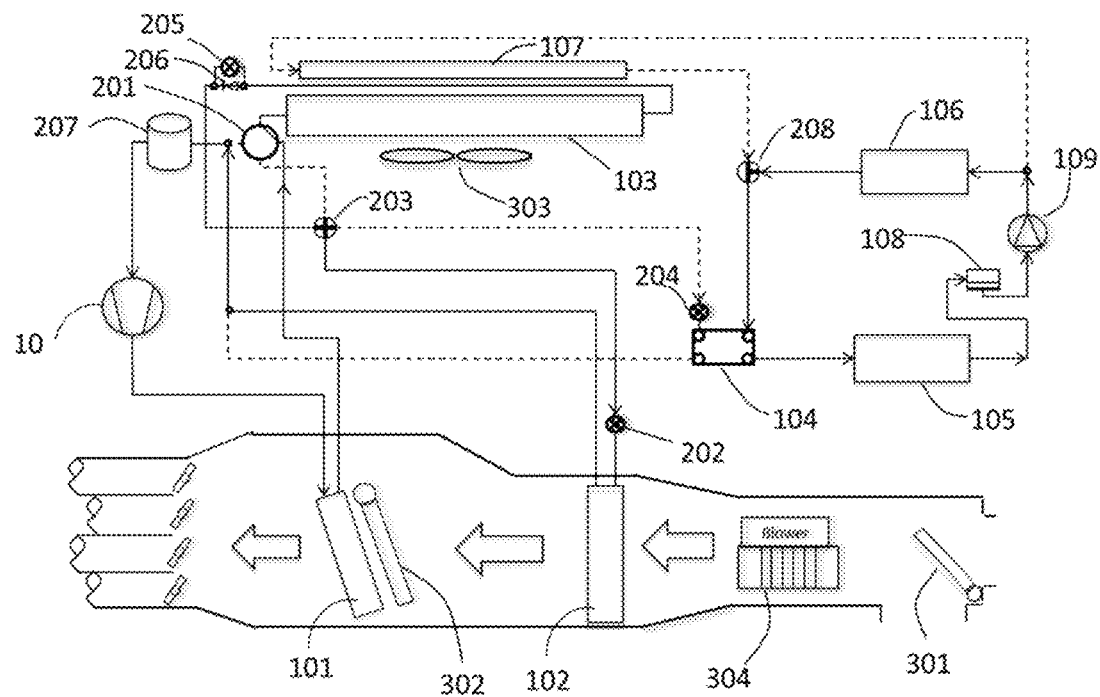
FIG. 9 is a schematic diagram showing a second embodiment of the thermal management system in the first refrigeration mode.

In a case that the temperature in the passenger compartment is relatively high and required to be decreased to improve the comfortableness of passengers, the thermal management system enters the cooling mode, and the cooling mode of the thermal management system includes a first cooling mode and a second cooling mode. The first cooling mode is referred to FIGS. 8 and 9, the refrigerant is compressed by the compressor 10 to be a high-temperature and high-pressure refrigerant, the refrigerant discharged from the compressor 10 enters the first heat exchanger, at this time, the temperature-regulating air door 302 of the first heat exchanger is closed, the airflow bypasses the first heat exchanger 101, the first heat exchanger 101 does not substantially participate in the heat exchange, and the first heat exchanger 101 is a flow passage of the refrigerant. The first valve device is controlled to be in the first operating state, the refrigerant discharged from the first heat exchanger 101 enters the first end port of the second heat exchanger 103 through the first valve device, the refrigerant exchanges heat with the ambient air in the second heat exchanger 103, to release the heat to the ambient air, and the refrigerant is changed to be relatively low-temperature and high-pressure. The refrigerant cooled by the second heat exchanger 103 passes through the unidirectional element 206, be throttled by the third throttling device 202, and enters the fifth heat exchanger 102, and the refrigerant in the fifth heat exchanger 102 absorbs the heat from the airflow, in other words, the refrigerant in the fifth heat exchanger 102 cools the surrounding air. At this time, the second throttling device 204 is turned off, a flow path from the second port of the second heat exchanger 103 to the first flow passage of the fourth heat exchanger 104 is blocked, and heat exchange is not performed between the coolant system and the refrigerant system. In the first cooling mode, in a case that the temperature of the heat generating equipment such as the battery and the like is relatively high and required to be decreased, the second connection port of the third three-way valve 208 may be closed, the third connection port of the third three-way valve 208 may be opened, and the radiator 107, the second flow passage of the fourth heat exchanger, the third heat exchanger 105 and the first pump 109 constitute a coolant system, in other words, the third heat exchanger 105 dissipates heat through the radiator 107, as shown in FIG. 8; in a case that the temperature of the heat generating equipment such as the battery and the like is low, the first connection port and the second connection port of the third three-way valve 208 are opened, the third connection port of the third three-way valve 208 is closed, and the second flow passage of the fourth heat exchanger 104, the first pump 109 and the heating device 106 constitute a coolant system, in other words, the fourth heat exchanger 104 absorbs heat through the heating device 106, to increase the temperature of the fourth heat exchanger 104 or the third heat exchanger 105, as shown in FIG. 9.

Figure 10:
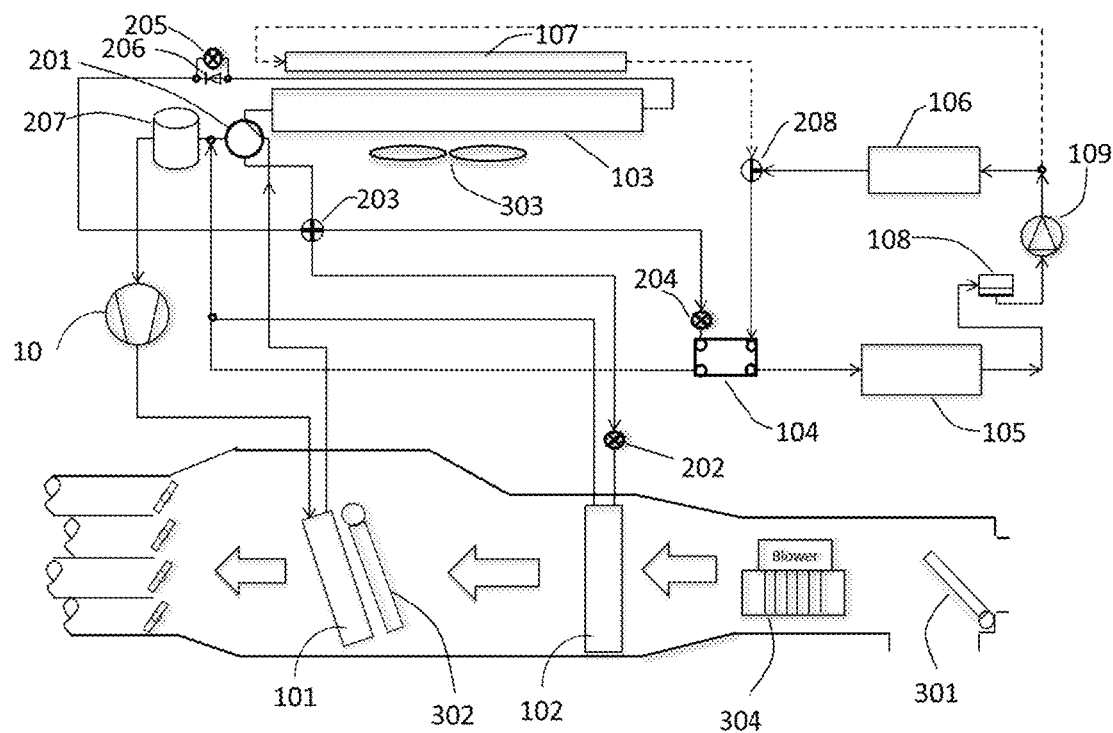
FIG. 10 is a schematic diagram showing the thermal management system in a second refrigeration mode.

In the second cooling mode, reference is made to FIG. 10, the first valve device is in the first operating state, and the refrigerant discharged from the second end port of the second heat exchanger 103 enters the first flow passage of the fourth heat exchanger 104 and the fifth heat exchanger 102, respectively. The refrigerant flowing through the fifth heat exchanger 102 is throttled and depressurized by the third throttling device 202, and exchanges heat with the airflow around the fifth heat exchanger 102, and releases cold energy, so as to decrease the temperature of the airflow. The refrigerant flowing through the fourth heat exchanger 104 is throttled and depressurized by the second throttling device 204, and exchanges heat with the coolant of the coolant system in the fourth heat exchanger 104, to decrease the temperature of the coolant, and the cooled coolant exchanges heat with the heat generating equipment such as the battery and the like in the third heat exchanger, to decrease the temperature of the heat generating equipment such as the battery and the like. In the second cooling mode, the heating device is turned off, the heating device only functions as the flow passage of the coolant, and the coolant system exchanges heat with the refrigerant system through the fourth heat exchanger 104, to provide cold energy to the third heat exchanger 105.

Figure 11:
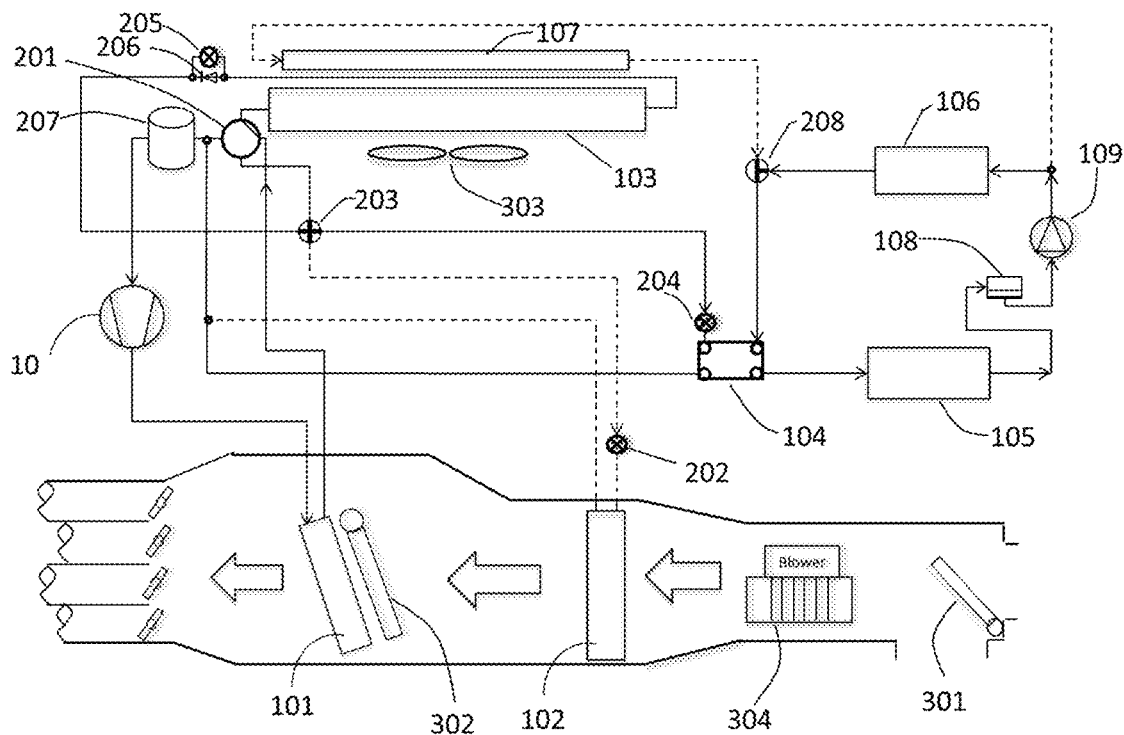
FIG. 11 is a schematic diagram showing the thermal management system in a deicing mode.

In winter, the temperature outside the vehicle is low in some areas. In a case that the outside temperature is below zero degrees Celsius or close to zero degrees Celsius, the second heat exchanger 103 absorbs heat from the ambient air in the heating mode, since the ambient air is below zero degrees Celsius or close to zero degrees Celsius, after operating for a certain period of time in the heating mode, the surface of the second heat exchanger 103 is prone to frost or freeze, thereby affecting the energy efficiency of the heat pump operation and even making the heat pump fail to generate heat, and therefore, the deicing/defrosting mode is required to be started. With reference to FIG. 11, in the deicing/defrosting mode, the compressor 10 consumes a certain amount of electrical energy or mechanical energy to compress the low-temperature and low-pressure refrigerant into the high-temperature and high-pressure refrigerant, the first valve device is in the first operating state, and the first valve device unblocks the flow passage leading from the first heat exchanger 101 to the first end port of the second heat exchanger 103, the second throttling device 204 is turned on, to unblock the flow path from the second end port of the second heat exchanger 103 to the first flow passage of the fourth heat exchanger 104, the third throttling device 202 is closed, to block the communication passage leading from the second end port of the second heat exchanger 103 to the fifth heat exchanger 102. At this time, the temperature-regulating air door 302 is closed, the airflow bypasses the first heat exchanger 101, the refrigerant flowing through the first heat exchanger does not participate in the heat exchange, a state of the high-temperature and high-pressure refrigerant is substantially unchanged when the refrigerant flows through the first heat exchanger 101, and the high-temperature and high-pressure refrigerant flows into the second heat exchanger 103 through the first valve device. The refrigerant releases heat in the second heat exchanger 103, to melt ice or frost of the second heat exchanger 103, so as to quickly remove the ice or frost on the surface of the second heat exchanger 103, and thereby the heating performance is recovered. The high-temperature and high-pressure refrigerant is cooled and then throttled and depressurized by the second throttling device 204, the cooled and depressurized refrigerant flows into the first flow passage of the fourth heat exchanger 104, and after being throttled and depressurized by the second throttling device 204, the refrigerant exchanges heat with the coolant of the coolant system in the fourth heat exchanger 104, the coolant system exchanges heat with the refrigerant through the fourth heat exchanger 104, and the second flow passage of the fourth heat exchanger and the first pump are in communication with the third heat exchanger; or, the second flow passage of the fourth heat exchanger, the heating device and the first pump are in communication with the third heat exchanger, the heating device is turned on, and the first pump is turned on; the coolant absorbs heat from the heat generating equipment such as the battery and the like, and the refrigerant absorbs heat from the coolant. In the deicing/defrosting mode, the thermal management system pumps heat from the heat generating equipment such as the battery and the like, and in a case that the heating device 106 is turned on, more heat is pumped from the heating device 106, which accelerates the removal of the ice or frost of the second heat exchanger 103, and thereby facilitating rapid realization of the heating performance of the thermal management system.

Figure 12:
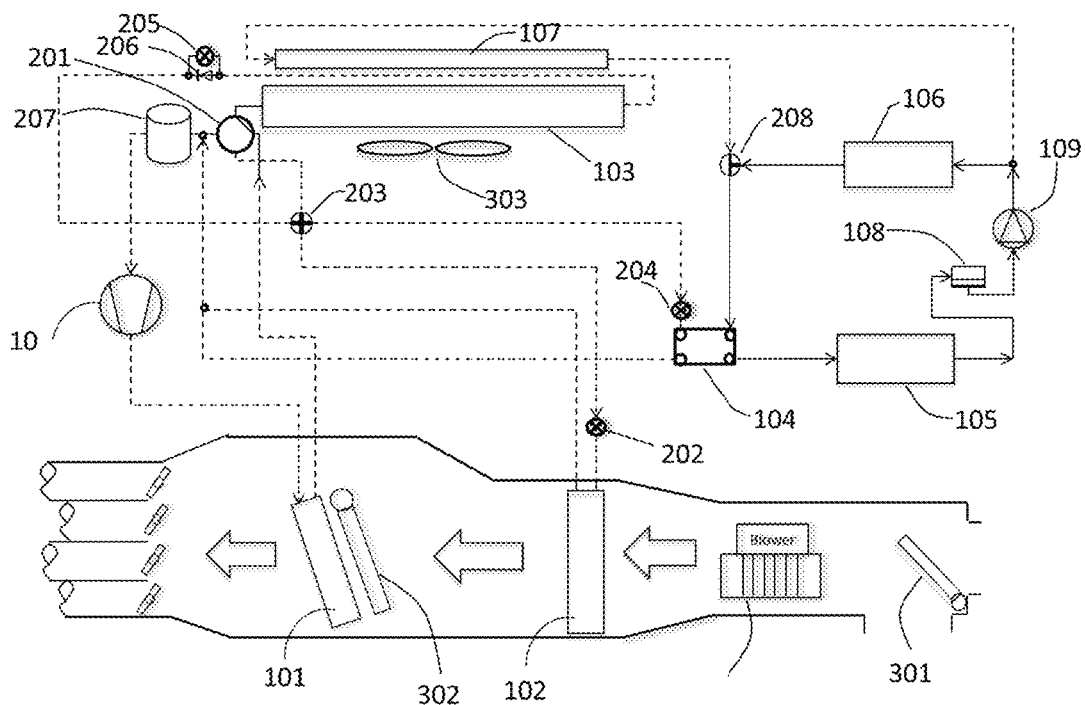
FIG. 12 is a schematic diagram showing a first embodiment of the thermal management system in a first circulation mode.
Figure 13:
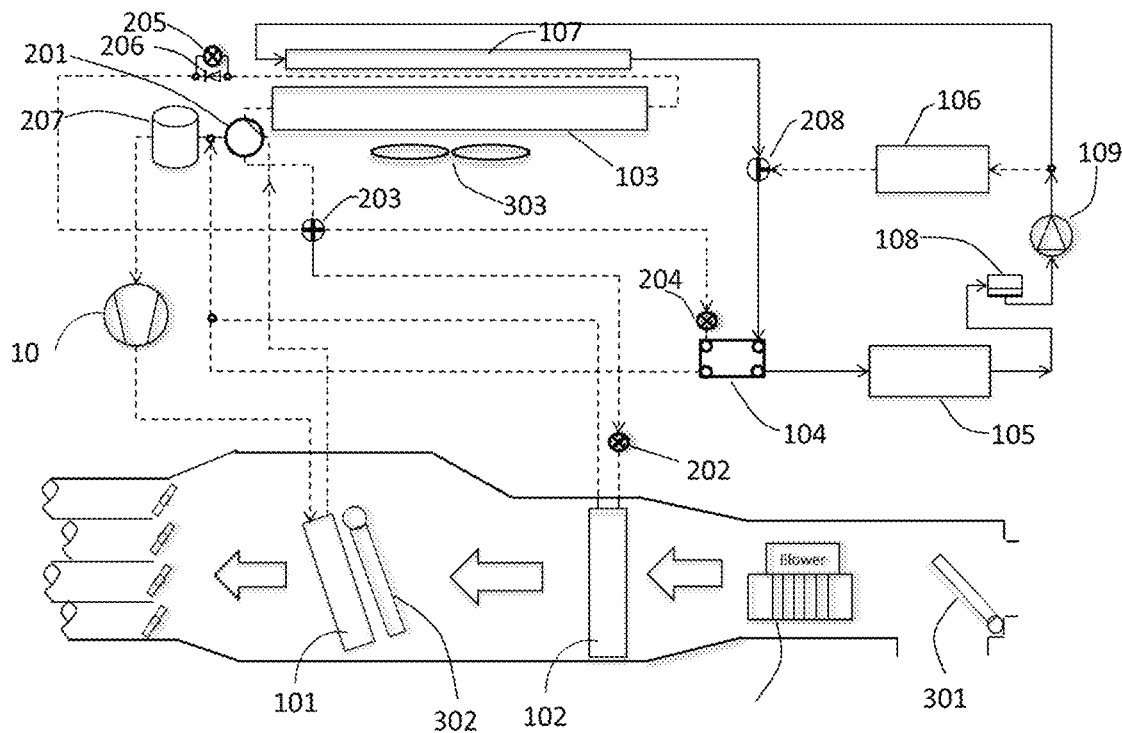
FIG. 13 is a schematic diagram showing a second embodiment of the thermal management system in the first circulation mode.

The thermal management system further includes a first circulation mode and a second circulation mode, and reference is made to FIGS. 11 to 13. In the first circulation mode, the compressor 10 of the thermal management system is turned off, in other words, the refrigerant in the refrigerant system does not flow. In a case that the temperature of the heat generating equipment such as the battery and the like is low, the heating device is incorporated into the coolant system, the heating device 106 and the first pump 109 are turned on, the heating device 106 releases heat to heat the coolant, and the coolant flowing through the third heat exchanger 105 exchanges heat with the heat generating equipment such as the battery and the like, to release heat to the heat generating equipment such as the battery and the like, as shown in FIG. 12. In a case that the temperature of the heat generating equipment such as the battery and the like is high and required to be decreased, the heating device 106 is turned off, the radiator 107 is incorporated into the coolant system, the first pump 109 is turned on, and the coolant exchanges heat with the heat generating equipment such as the battery and the like in the third heat exchanger 105, to absorb the heat of the heat generating equipment such as the battery and the like. The coolant is driven by the first pump to flow toward the radiator 107, and the coolant exchanges heat with the ambient air in the radiator 107, to release heat to the air around the radiator 107, thereby reducing the temperature of the heat generating equipment such as the battery and the like, and reference is made to FIG. 13.

In a case that the temperature of the heat generating equipment such as the battery and the like is high, and it is not to decrease the temperature of the heat generating equipment such as the battery and the like by employing the first circulation mode, the thermal management system enters the second circulation mode, as shown in FIG. 11. The compressor 10 is turned on, the first valve device is in the first operating state, the refrigerant outlet of the first heat exchanger 101 is in communication with the first end port of the second heat exchanger 103, the second throttling device is turned on, to unblock the communication passage leading from the second end port of the second heat exchanger 103 to the first flow passage of the fourth heat exchanger 104, the thermal management system turns off the heating device or prevents the coolant from flowing into the heating device, the refrigerant releases heat to the ambient air in the second heat exchanger 103, the refrigerant flowing from the second heat exchanger 103 enters the fourth heat exchanger 104 through the second throttling device, to exchange heat with the coolant in the fourth heat exchanger 104, to absorb the heat from the coolant, and thereby decreasing the temperature of the heat generating equipment such as the battery and the like.

Compared with the conventional art, the thermal management system of the present application includes the refrigerant system and the coolant system, and the thermal management system further includes the fourth heat exchanger, the refrigerant system and the coolant system can exchange heat with each other in the fourth heat exchanger, which facilitates improvement of the performance of the thermal management system.

It should be noted that the above embodiments are only intended to describe the present application, but not to limit the technical solutions described in the present application, for example, the directional definition of "front", "back", "left", "right", "upper", "lower" and the like. Although the present specification has been described in detail with reference to the above embodiments, it should be understood by those skilled in the art that combinations, modifications or equivalent replacements may be made to the present application, and all the technical solutions and improvements thereof without departing from the spirit and scope of the present application are deemed to fall into the scope of the present application defined by the claims.

Based on the above description of the disclosed embodiments, those skilled in the art are capable of carrying out or using the present application. It is obvious for those skilled in the art to make many modifications to these embodiments. The general principle defined herein may be applied to other embodiments without departing from the spirit or scope of the present application. Therefore, the present application is not limited to the embodiments illustrated herein, but should be defined by the broadest scope consistent with the principle and novel features disclosed herein.

The invention claimed is:

1. A thermal management system, wherein the thermal management system comprises a refrigerant system and a coolant system, and a refrigerant of the refrigerant system and a coolant of the coolant system are isolated from each other without fluidical communication;

the refrigerant system comprises a compressor, a first throttling device, a second throttling device, a first heat exchanger, a second heat exchanger and a first valve device; the second heat exchanger comprises a first end port and a second end port, the first throttling device is in communication with the second end port of the second heat exchanger, a refrigerant inlet of the first heat exchanger is in communication with an outlet of the compressor, a refrigerant outlet of the first heat exchanger is in communication with the first valve device, the compressor is in communication with the first valve device through the first heat exchanger, the first heat exchanger is in communication with the first throttling device through the first valve device, and the first end port of the second heat exchanger is in communication with a suction port of the compressor or the refrigerant outlet of the first heat exchanger through the first valve device; and the coolant system comprises a third heat exchanger and a first pump; the thermal management system further comprises a fourth heat exchanger, the fourth heat exchanger comprises a first flow passage and a second flow passage, an inlet of the first flow passage of the fourth heat exchanger is in communication with the second throttling device, an outlet of the first flow passage of the fourth heat exchanger is in communication with the suction port of the compressor, the second flow passage of the fourth heat exchanger is in communication with the third heat exchanger and the first pump, the thermal management system has an operating mode, under the operating mode, the coolant system exchanges heat with the refrigerant system in the fourth heat exchanger; and in a deicing mode of the thermal management system, the second heat exchanger is in communication with the first flow passage of the fourth heat exchanger through the second throttling device, the first valve device comprises a first communication port, a second communication port, a third communication port, and a fourth communication port, the first communication port is in communication with the refrigerant outlet of the first heat exchanger, the fourth communication port is in communication with the suction port of the compressor, the second communication port is in communication with the first throttling device and the second throttling device, and the third communication port is in communication with the first end port of the second heat exchanger, and the first valve device at least comprises a first operating state and a second operating state, in the first operating state of the first valve device, the first communication port is in communication with the third communication port, and the fourth communication port is not in communication with the second communication port; and in the second operating state of the first valve device, the first communication port is in communication with the second communication port, and the third communication port is in communication with the fourth communication port.

2. The thermal management system according to claim 1, wherein the first valve device comprises a first multi-way reversing device, the first multi-way reversing device comprises a first inlet, a first valve hole, a second valve hole, and a third valve hole, the first inlet is in communication with the first communication port, the first valve hole is in communication with the third communication port, the second valve hole is in communication with the fourth communication port, the third valve hole is in communication with the second communication port; in the first operating state of the first valve device, the first inlet is in communication with the first valve hole, and the second valve hole is not in communication with the third valve hole, and in the second operating state of the first valve device, the first inlet is in communication with the third valve hole, and the first valve hole is in communication with the second valve hole.

3. The thermal management system according to claim 1, wherein the first valve device comprises a multi-way reversing device and a first valve component, the multi-way reversing device comprises a second inlet, a fourth valve hole, a fifth valve hole and a sixth valve hole, the first valve component comprises a first end port and a second port, the first end port of the first valve component is in communication with the sixth valve hole, the second end port of the first valve component is in communication with the second communication port, the fifth valve hole is in communication with the fourth communication port, the fourth valve hole is in communication with the third communication port, the second inlet is in communication with the first communication port; in the first operating state of the first valve device, the second inlet is in communication with the fourth valve hole, the fifth valve hole is in communication with the sixth valve hole, and the first valve component is closed; and in the second operating state of the first valve device, the second inlet is in communication with the sixth valve hole, the fourth valve hole is in communication with the fifth valve hole, and the first valve component is opened.

4. The thermal management system according to claim 1, wherein the first valve device comprises a first valve module, a second valve module and a third valve module, the first valve module, the second valve module and the third valve module each comprises a first end port and a second end port, the first end port of the first valve module is in communication with the first communication port, the first end port of the second valve module is in communication with the first communication port, the second end port of the first valve module is in communication with the second communication port, the second end port of the second valve module is in communication with third communication port, the second end port of the third valve module is in communication with the third communication port, the first end port of the third valve module is in communication with the fourth communication port; in the first operating state of the first valve device, the second valve module is opened, and the first valve module and the third valve module are closed; and in the second operating state of the first valve device, the first valve module is opened, the third valve module is opened, and the second valve module is closed.

5. The thermal management system according to claim 1, wherein the first valve device comprises a first three-way valve and a valve module, the first three-way valve comprises a first port, a second port and a third port, the first port of the first three-way valve is in communication with the first communication port, the second port of the first three-way valve is in communication with the third communication port, the second end port of the valve module is in communication with the third communication port, the third port of the first three-way valve is in communication with the second communication port, the first end port of the valve module is in communication with the fourth communication port; in the first operating state of the first valve device, the first port of the first three-way valve is in communication with the second port of the first three-way valve, the first port of the first three-way valve is not in communication with the third port of the first three-way valve, and the valve module is closed; and in the second operating state of the first valve device, the first port of the first three-way valve is in communication with the third port of the first three-way valve, the valve module is opened, and the first port of the first three-way valve is not in communication with the second port of the first three-way valve.

6. The thermal management system according to claim 1, wherein the coolant system further comprises a heating device, the heating device comprises at least two end ports and a coolant flow passage,
   the at least two end ports of the heating device are in communication with the coolant flow passage, and,
   the heating device, the first pump, the third heat exchanger, and the second flow passage of the fourth heat exchanger are connected in series.

7. The thermal management system according to claim 1, wherein the coolant system further comprises a heating device, the heating device comprises at least two end ports and a coolant flow passage, and the at least two end ports of the heating device are in communication with the coolant flow passage;
   the coolant system further comprises a first valve unit and a second valve unit, the first valve unit, the second flow passage of the fourth heat exchanger, the third heat exchanger and the first pump are connected in series; and,
   the second valve unit, the heating device, the second flow passage of the fourth heat exchanger, the third heat exchanger and the first pump are connected in series.

8. The thermal management system according to claim 1, wherein the coolant system further comprises a heating device, the heating device comprises at least two end ports and a coolant flow passage,
   the at least two end ports of the heating device are in communication with the coolant flow passage,
   the second flow passage of the fourth heat exchanger comprises a first end port and a second end port; and
   the coolant system comprises a three-way valve, a first end port of the three-way valve is in communication with the first end port of the second flow passage of the fourth heat exchanger through the heating device, a second end port of the three-way valve is in communication with the first end port of the second flow passage of the fourth heat exchanger, and a third end port of the three-way valve is in communication with the end port of the second flow passage of the fourth heat exchanger.

9. The thermal management system according to claim 6, wherein the second flow passage of the fourth heat exchanger comprises a first end port and a second end port; the thermal management system further comprises a radiator, the radiator comprises a flow passage for a coolant, the thermal management system further comprises a three-way valve, the three-way valve comprises a first connection port, a second connection port and a third connection port, the first connection port of the three-way valve is in communication with the second end port of the second flow passage of the fourth heat exchanger through the heating device, the second connection port of the three-way valve is in communication with the second end port of the second flow passage of the fourth heat exchanger through the radiator, the third connection port of the three-way valve is in communication with the first end port of the second flow passage of the fourth heat exchanger, and the thermal management system has an operating mode, under the operating mode, the coolant flows into the heating device or the radiator by the three-way valve.

10. The thermal management system according to claim 7, wherein the thermal management system further comprises a radiator, the radiator comprises a flow passage for a coolant, the thermal management system comprises a third valve unit and a fourth valve unit, the radiator and the third valve unit are connected in series, the heating device and the fourth valve unit are connected in series, and the thermal management system has an operating mode, under the operating mode, the coolant flows into the heating device or the radiator by the third valve unit and the fourth valve unit.

11. The thermal management system according to claim 9, wherein the refrigerant system further comprises a fifth heat exchanger and a third throttling device, the third throttling device is in communication with an inlet of the fifth heat exchanger, an outlet of the fifth heat exchanger is in communication with the suction port of the compressor; the thermal management system has an operating mode, under the operating mode, the first heat exchanger communicates with the third throttling device through the first valve device, the second end port of the second heat exchanger communicates with the third throttling device; and
   the thermal management system further comprises an air conditioning cabinet body and a temperature-regulating air door, and, the first heat exchanger, the temperature-regulating air door and the fifth heat exchanger are arranged in the air conditioning cabinet body, the fifth heat exchanger is arranged in an upwind direction of the first heat exchanger, and the thermal management system has an operating mode, under the operating mode, the temperature-regulating air door is controlled, when the temperature-regulating air door is opened, the first heat exchanger performs heat exchange; and when the temperature-regulating air door is closed, the first heat exchanger does not perform heat exchange.

12. The thermal management system according to claim 11, wherein the thermal management system has a circulation mode, the circulation mode comprises a first circulation mode and a second circulation mode,
   in the first circulation mode, the thermal management system turns off the compressor, turns on the first pump, and unblocks a communication passage located between the heating device and the third heat exchanger or located between the radiator and the third heat exchanger; and in the second circulation mode,
the thermal management system turns on the compressor,
a communication passage between the refrigerant outlet of the first heat exchanger and the first end port of the second heat exchanger is unblocked by the first valve device,
the second end port of the second heat exchanger is in communication with the first flow passage of the fourth heat exchanger through the second throttling device,
a communication passage between the third heat exchanger and the second flow passage of the fourth heat exchanger is unblocked, and
the thermal management system turns off the heating device or prevents the coolant from flowing into the heating device, and turns on the first pump and the second throttling device.

13. The thermal management system according to claim 12, wherein the thermal management system further comprises a deicing mode and a heating mode;
in the deicing mode,
the communication passage between the refrigerant outlet of the first heat exchanger and the first end port of the second heat exchanger is unblocked by the first valve device,
the second end port of the second heat exchanger is in communication with the first flow passage of the fourth heat exchanger through the second throttling device,
the second flow passage of the fourth heat exchanger, the first pump are in communication with the third heat exchanger; or, the second flow passage of the fourth heat exchanger, the heating device and the first pump are in communication with the third heat exchanger,
the heating device is turned on,
the first pump and the second throttling device are turned on;
the heating mode comprises a first heating mode and a second heating mode, in the first heating mode,
the refrigerant outlet of the first heat exchanger is in communication with the first throttling device and the second throttling device through the first valve device,
the second flow passage of the fourth heat exchanger and the first pump are in communication with the third heat exchanger; or, the second flow passage of the fourth heat exchanger, the heating device and the first pump are in communication with the third heat exchanger,
the heating device is turned on,
the first pump is turned on, and
the first throttling device and the second throttling device are turned on;
in the second heating mode,
the first heat exchanger is in communication with the second throttling device through the first valve device,
the second flow passage of the fourth heat exchanger and the first pump are in communication with the third heat exchanger; or, the second flow passage of the fourth heat exchanger, the heating device and the first pump are in communication with the third heat exchanger,
the heating device is turned on, and
the first pump and the second throttling device are turned on.

14. The thermal management system according to claim 13, wherein the thermal management system further comprises a dehumidification mode and a refrigeration mode,
the dehumidification mode comprises a first dehumidification mode, a second dehumidification mode and a third dehumidification mode,
in the first dehumidification mode,
the refrigerant outlet of the first heat exchanger is in communication with the third throttling device through the first valve device,
the refrigerant outlet of the first heat exchanger is in communication with the first throttling device and/or the second throttling device through the first valve device,
the third throttling device is turned on,
the first throttling device is turned on and/or the second throttling device is turned on,
the first pump is turned on, and
the temperature-regulating air door is opened;
in the second dehumidification mode,
the refrigerant outlet of the first heat exchanger is in communication with the first end port of the second heat exchanger through the first valve device,
the second end port of the second heat exchanger is in communication with the third throttling device,
the throttling device is turned on, and
the temperature-regulating air door is opened;
in the third dehumidification mode,
the refrigerant outlet of the first heat exchanger is in communication with the first end port of the second heat exchanger through the first valve device,
the second end port of the second heat exchanger is in communication with the third throttling device,
the second throttling device and the third throttling device are turned on,
the temperature-regulating air door is opened, and
the first pump is turned on;
the refrigeration mode comprises a first refrigeration mode and a second refrigeration mode,
in the first refrigeration mode,
the refrigerant outlet of the first heat exchanger is in communication with the first end port of the second heat exchanger through the first valve device,
the second end port of the second heat exchanger is in communication with the third throttling device,
the third throttling device is turned on, and
the temperature-regulating air door is closed;
in the second refrigeration mode,
the refrigerant outlet of the first heat exchanger is in communication with the first end port of the second heat exchanger through the first valve device,
the second end port of the second heat exchanger and the second throttling device are in communication with the third throttling device,
the second throttling device, the third throttling device and the first pump are turned on, and
the temperature-regulating air door is closed.

15. The thermal management system according to claim 2, wherein the coolant system further comprises a heating device, the heating device comprises at least two end ports and a coolant flow passage, the at least two end ports of the heating device are in communication with the coolant flow passage, and, the heating device, the first pump, the third heat exchanger, and the second flow passage of the fourth heat exchanger are connected in series.

16. The thermal management system according to claim 15, wherein the refrigerant system further comprises a fifth heat exchanger and a third throttling device, the third throttling device is in communication with an inlet of the fifth heat exchanger, an outlet of the fifth heat exchanger is in communication with the suction port of the compressor; the thermal management system has an operating mode, under the operating mode, the first heat exchanger communicates with the third throttling device through the first valve device, the second end port of the second heat exchanger communicates with the third throttling device; and the thermal management system further comprises an air conditioning cabinet body and a temperature-regulating air door, the first heat exchanger, the temperature-regulating air door and the fifth heat exchanger are arranged in the air conditioning cabinet body, the fifth heat exchanger is arranged in an upwind direction of the first heat exchanger, and the thermal management system has an operating mode, under the operating mode, the temperature-regulating air door is controlled, when the temperature-regulating air door is opened, the first heat exchanger performs heat exchange; and when the temperature-regulating air door is closed, the first heat exchanger does not perform heat exchange.

17. The thermal management system according to claim 16, wherein the thermal management system further comprises a deicing mode and a heating mode;

in the deicing mode, the communication passage between the refrigerant outlet of the first heat exchanger and the first end port of the second heat exchanger is unblocked by the first valve device, the second end port of the second heat exchanger is in communication with the first flow passage of the fourth heat exchanger through the second throttling device, the second flow passage of the fourth heat exchanger, the first pump are in communication with the third heat exchanger; or, the second flow passage of the fourth heat exchanger, the heating device and the first pump are in communication with the third heat exchanger, the heating device is turned on, and the first pump and the second throttling device are turned on;

the heating mode comprises a first heating mode and a second heating mode, in the first heating mode, the refrigerant outlet of the first heat exchanger is in communication with the first throttling device and the second throttling device through the first valve device, the second flow passage of the fourth heat exchanger and the first pump are in communication with the third heat exchanger; or, the second flow passage of the fourth heat exchanger, the heating device and the first pump are in communication with the third heat exchanger, the heating device is turned on, the first pump is turned on, and the first throttling device and the second throttling device are turned on;

in the second heating mode, the first heat exchanger is in communication with the second throttling device through the first valve device, the second flow passage of the fourth heat exchanger and the first pump are in communication with the third heat exchanger; or, the second flow passage of the fourth heat exchanger, the heating device and the first pump are in communication with the third heat exchanger, the heating device is turned on, and the first pump and the second throttling device are turned on.

18. The thermal management system according to claim 2, wherein the refrigerant system further comprises a fifth heat exchanger and a third throttling device, the third throttling device is in communication with an inlet of the fifth heat exchanger, an outlet of the fifth heat exchanger is in communication with the suction port of the compressor; the first heat exchanger is in communication with the third throttling device through the first valve device, the second end port of the second heat exchanger is in communication with the third throttling device; and the thermal management system further comprises an air conditioning cabinet body and a temperature-regulating air door, the first heat exchanger, the temperature-regulating air door and the fifth heat exchanger are arranged in the air conditioning cabinet body, the fifth heat exchanger is arranged in an upwind direction of the first heat exchanger, and the thermal management system has an operating mode, under the operating mode, the temperature-regulating air door is controlled, when the temperature-regulating air door is opened, the first heat exchanger performs heat exchange; and when the temperature-regulating air door is closed, the first heat exchanger does not perform heat exchange.

19. The thermal management system according to claim 3, wherein the refrigerant system further comprises a fifth heat exchanger and a third throttling device, the third throttling device is in communication with an inlet of the fifth heat exchanger, an outlet of the fifth heat exchanger is in communication with the suction port of the compressor; the thermal management system has an operating mode, under the operating mode, the first heat exchanger is communicates with the third throttling device through the first valve device, the second end port of the second heat exchanger communicates with the third throttling device; and the thermal management system further comprises an air conditioning cabinet body and a temperature-regulating air door, the first heat exchanger, the temperature-regulating air door and the fifth heat exchanger are arranged in the air conditioning cabinet body, the fifth heat exchanger is arranged in an upwind direction of the first heat exchanger, and the thermal management system has an operating mode, under the operating mode, the temperature-regulating air door is controlled, when the temperature-regulating air door is opened, the first heat exchanger performs heat exchange; and when the temperature-regulating air door is closed, the first heat exchanger does not perform heat exchange.

* * * * *